(12) United States Patent
Itoh et al.

(10) Patent No.: US 9,787,907 B2
(45) Date of Patent: Oct. 10, 2017

(54) SUBSTANCE DETECTION DEVICE

(71) Applicant: Panasonic Intellectual Property Management Co., Ltd., Osaka (JP)

(72) Inventors: Tatsuo Itoh, Osaka (JP); Koichi Kusukame, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/846,938

(22) Filed: Sep. 7, 2015

(65) Prior Publication Data

US 2016/0080625 A1    Mar. 17, 2016

(30) Foreign Application Priority Data

Sep. 17, 2014    (JP) .................. 2014-188991

(51) Int. Cl.
*H04N 5/235*    (2006.01)
*G01J 1/08*    (2006.01)
(Continued)

(52) U.S. Cl.
CPC .............. *H04N 5/2354* (2013.01); *G01J 1/08* (2013.01); *G01J 1/44* (2013.01); *G06K 9/00771* (2013.01);
(Continued)

(58) Field of Classification Search
CPC .. H04N 5/2354; H04N 5/23251; H04N 5/335; H04N 5/3458; H04N 5/35563;
(Continued)

(56) References Cited

U.S. PATENT DOCUMENTS

| | | | | |
|---|---|---|---|---|
| 4,772,789 A | * | 9/1988 | Maram | G01M 3/38 250/330 |
| 5,001,346 A | * | 3/1991 | Barkhoudarian | G01M 3/38 250/330 |

(Continued)

FOREIGN PATENT DOCUMENTS

| | | |
|---|---|---|
| JP | 2-236787 | 9/1990 |
| JP | 4-328449 | 11/1992 |
| JP | 2007-010584 | 1/2007 |
| JP | 2010-025622 | 2/2010 |
| JP | 2014-115280 | 6/2014 |
| WO | 2012/101430 | 8/2012 |

OTHER PUBLICATIONS

The Extended European Search Report dated Feb. 18, 2016 for the related European Patent Application No. 15183411.6.
(Continued)

*Primary Examiner* — Nicholas Giles
(74) *Attorney, Agent, or Firm* — Greenblum & Bernstein, P.L.C.

(57) ABSTRACT

A substance detection device includes an illuminator that illuminates a monitoring range with light at a first wavelength and light at a second wavelength at different timings, an image capturer that obtains a first actual image by capturing an image of the monitoring range which is illuminated by the light at the first wavelength and obtains a second actual image by capturing an image of the monitoring range which is illuminated by the light at the second wavelength, and an image processor that acquires a difference in lightness of corresponding pixels between the first actual image and the second actual image that are obtained by the image capturer, compares the acquired difference in lightness of the corresponding pixels with a reference value, and detects a specific substance that is present in the monitoring range based on a result of the comparison.

13 Claims, 11 Drawing Sheets

(51) Int. Cl.
*G01J 1/44* (2006.01)
*G06K 9/00* (2006.01)
*G06T 7/20* (2017.01)
*H04N 5/232* (2006.01)
*H04N 5/335* (2011.01)
*H04N 5/345* (2011.01)
*H04N 5/355* (2011.01)
*G06T 7/90* (2017.01)
*G06K 9/20* (2006.01)

(52) U.S. Cl.
CPC ............... *G06T 7/20* (2013.01); *G06T 7/90* (2017.01); *H04N 5/23251* (2013.01); *H04N 5/335* (2013.01); *H04N 5/3458* (2013.01); *H04N 5/35563* (2013.01); *G01J 2001/448* (2013.01); *G06K 9/2018* (2013.01); *G06K 9/2027* (2013.01); *G06T 2207/10024* (2013.01)

(58) Field of Classification Search
CPC ...... G06T 7/90; G06T 7/20; G01J 1/08; G01J 1/44; G06K 9/00771; G01N 21/314; G01N 21/35
See application file for complete search history.

(56) References Cited

U.S. PATENT DOCUMENTS

| | | | |
|---|---|---|---|
| 8,622,569 B1* | 1/2014 | Crookham | F21V 14/02 362/145 |
| 2013/0195435 A1* | 8/2013 | Yost | H04N 5/222 396/164 |
| 2013/0342698 A1 | 12/2013 | Thompson | |
| 2014/0078383 A1* | 3/2014 | Schmaelzle | G03B 15/02 348/371 |
| 2015/0330769 A1 | 11/2015 | Yamada et al. | |
| 2016/0037041 A1* | 2/2016 | Shih | H04N 5/2351 348/370 |

OTHER PUBLICATIONS

Seon-Hwa Park et al: "Organic vapor detection using a color-difference image technique for distributed Bragg reflector structured porous silicon", Sensors and Actuators B: Chemical, vol. 147, No. 2, Jun. 3, 2010 (Jun. 3, 2010), pp. 775-779.

* cited by examiner

SUBSTANCE DETECTION DEVICE

BACKGROUND

1. Technical Field

The present disclosure relates to a substance detection device that detects a specific substance which is present in a monitoring range.

2. Description of the Related Art

In related art, there has been a substance detection device that captures images of a monitoring target object at a prescribed time interval and detects presence of a substance in the monitoring target object based on a change (differential values) between the plural successive captured images (see Japanese Unexamined Patent Application Publication No. 2-236787, for example).

SUMMARY

In one general aspect, the techniques disclosed here feature a substance detection device including: an illuminator that illuminates a monitoring range with light at a first wavelength and light at a second wavelength at different timings; an image capturer that obtains a first actual image by capturing an image of the monitoring range which is illuminated by the light at the first wavelength and obtains a second actual image by capturing an image of the monitoring range which is illuminated by the light at the second wavelength; and an image processor that acquires a difference in lightness of corresponding pixels between the first actual image and the second actual image that are obtained by the image capturer, compares the acquired difference in lightness of the corresponding pixels with a reference value, and detects a specific substance that is present in the monitoring range based on a result of the comparison.

The present disclosure may realize a substance detection device with high detection accuracy that is not influenced by motion or a color of a substance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
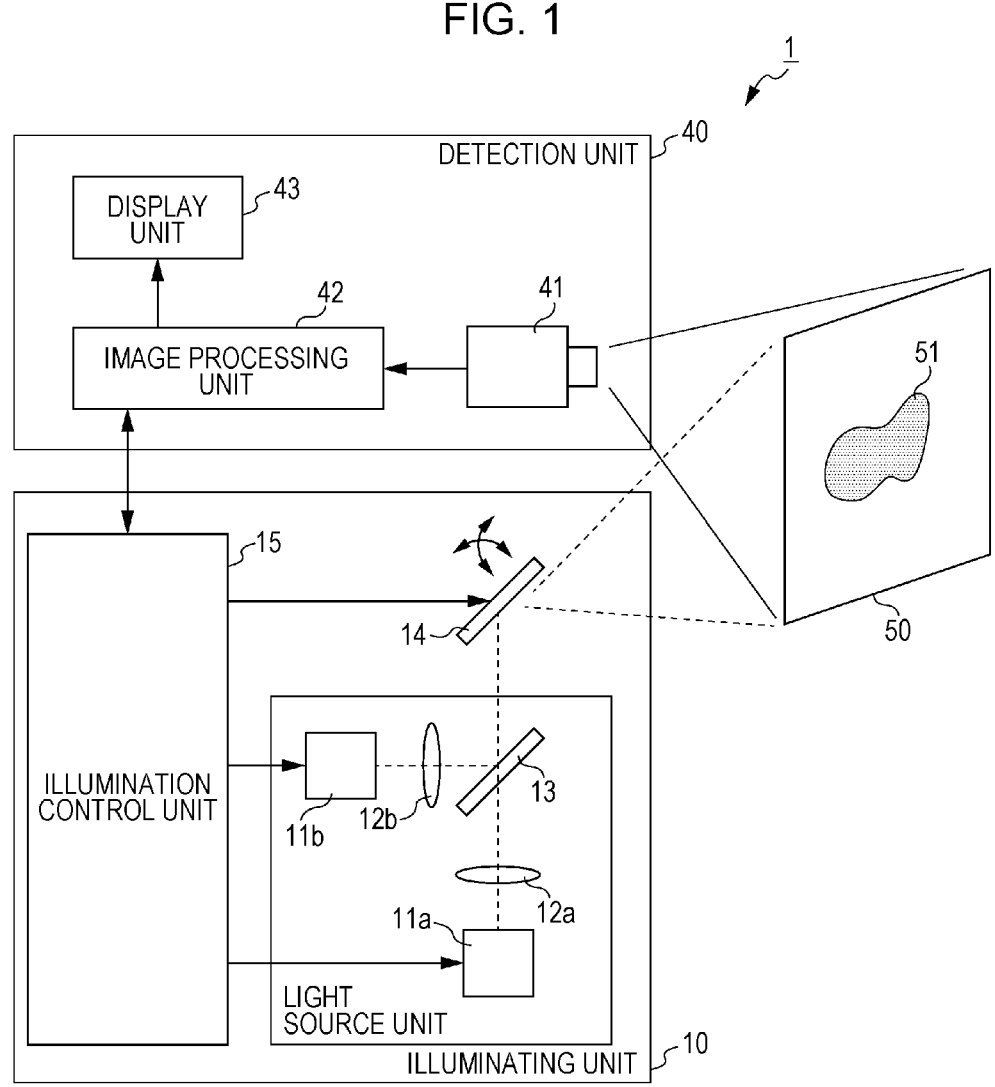
FIG. 1 is a schematic configuration diagram that illustrates one example of a substance detection device according to a first embodiment.

<Underlying Knowledge Forming Basis of the Present Disclosure>

Japanese Unexamined Patent Application Publication No. 2-236787 discloses a substance detection device that detects presence of a substance in a monitoring target object based on a change (differential values) between plural successive captured images of the monitoring target object.

Such a substance detection device in related art has a problem that detection of a still substance, a substance with little motion, or the like is difficult (low detection accuracy) because the substance detection device deals with the change between plural successive captured images.

Further, the substance detection device in related art captures, by a monitoring camera, images of a substance that is illuminated by natural light or common white illumination. Thus, there have been a problem that, for example, a colorless and transparent substance, a substance that has the same type color as the background, or the like does not appear as clearly as the difference between the area where the substance is present and the area where the substance is not present is easily distinguished and thus the substance may not be detected. Therefore, a further improvement has been desired for the substance detection device.

<Method Focused on by the Present Inventors>

Accordingly, the present inventors have conceived a new original idea of a substance detection device with high detection accuracy by using illumination that irradiates a substance to be detected with specific light that is absorbed by the substance.

Various aspects of the present disclosure based on the new original idea are as follows:

<Outlines of Aspects of Present Disclosure>

A substance detection device according to one aspect of the present disclosure includes:

an illuminator that illuminates a monitoring range with light at a first wavelength and light at a second wavelength at different timings;

an image capturer that obtains a first actual image by capturing an image of the monitoring range which is illuminated by the light at the first wavelength and obtains a second actual image by capturing an image of the monitoring range which is illuminated by the light at the second wavelength; and an image processor that acquires a difference in lightness of corresponding pixels between the first actual image and the second actual image that are obtained by the image capturer, compares the acquired difference in lightness of the corresponding pixels with a reference value, and detects a specific substance that is present in the monitoring range based on a result of the comparison.

The one aspect may realize a substance detection device that may highly accurately detect a specific substance without being influenced by motion and colors in a monitoring range.

In the one aspect, when the light at the first wavelength is set as light whose absorptance by the specific substance is higher than the light at the second wavelength, the specific substance may thereby be detected with yet higher accuracy.

In the one aspect, the substance detection device may include a memory, the image capturer may obtain, before obtaining the first and second actual images, a first reference image by capturing an image of the monitoring range which is illuminated by the light at the first wavelength while the specific substance is absent, and may obtain, before obtaining the first and second actual images, a second reference image by capturing an image of the monitoring range which is illuminated by the light at the second wavelength while the specific substance is absent, each of the first reference image and the second reference image that are obtained by the image capturer may be stored in the memory, and a difference in lightness of corresponding pixels between the first reference image and the second reference image may be set as the reference value.

In the one aspect, the illuminator may include a scanner that changes areas which are illuminated by the light at the first wavelength and areas which are illuminated by the light at the second wavelength in the monitoring range.

In the one aspect, the scanner may include a mirror that reflects each of the light at the first wavelength and the light at the second wavelength and an actuator that changes a direction of the mirror.

In the one aspect, the illuminator may adjust an intensity of the light at the first wavelength in response to the area that is illuminated by the light at the first wavelength to cause lightness of each of the pixels that correspond to the monitoring range in the first reference image to become identical to each other, and the illuminator may adjust an intensity of the light at the second wavelength in response to the area that is illuminated by the light at the second wavelength to cause lightness of each of the pixels that correspond to the monitoring range in the second reference image to become identical to each other.

In the one aspect, a ratio between the intensity of the light at the first wavelength with which the illuminator illuminates the area in the monitoring range in a case of obtaining the first actual image and the intensity of the light at the first wavelength that illuminates the same area as the area in a case of obtaining the first reference image and a ratio between the intensity of the light at the second wavelength with which the illuminator illuminates the area in the monitoring range in a case of obtaining the second actual image and the intensity of the light at the second wavelength that illuminates the same area as the area in a case of obtaining the second reference image may be the same.

In the one aspect, a light source that produces the light at the first wavelength and the light at the second wavelength may be included.

In a case where a wavelength tunable light source that changes the wavelength of produced light to the first wavelength and the second wavelength is used, light at plural wavelengths may be emitted by one light source. Thus, the substance detection device may be used as a common illuminating apparatus.

In the one aspect, the light source may include a first light source that produces the light at the first wavelength and a second light source that produces the light at the second wavelength.

In the one aspect, the light source may be any of a semiconductor laser, a light emitting diode, a super-luminescent diode, and a semiconductor-pumped solid-state laser.

Further, a substance detection device according to another aspect of the present disclosure includes:

an illuminator that illuminates a monitoring range with light at a first wavelength;

an image capturer that obtains an initial image by capturing an image of the monitoring range which is illuminated by the illuminator with the light at the first wavelength in a state where a specific substance is not present in the monitoring range and obtains an actual image by capturing an image of the monitoring range which is illuminated by the illuminator with the light at the first wavelength in a case of detecting whether the specific substance is present in the monitoring range; and an image processor that acquires a difference in lightness of corresponding pixels between the initial image and the actual image that are obtained by the image capturer, compares the acquired difference in lightness of the corresponding pixels with a reference value, and detects the specific substance that is present in the monitoring range based on a result of the comparison.

The other aspect may also realize a substance detection device that may highly accurately detect a specific substance without being influenced by motion and colors.

In the other aspect, when the light at the first wavelength of illumination by the illuminator is set as light whose absorptance by the specific substance is higher than a prescribed value, the specific substance may thereby be detected with yet higher accuracy.

In the other aspect, the substance detection device may include a memory, the image capturer may obtain the initial image by capturing an image of the monitoring range which is illuminated by the light at the first wavelength and where the specific substance is not present, and the initial image that is obtained by the image capturer may be stored in the memory.

In the other aspect, the illuminator may include a scanner that changes areas which are illuminated by the light at the first wavelength in the monitoring range.

In the other aspect, the scanner may include a mirror that reflects the light at the first wavelength and an actuator that changes a direction of the mirror.

In the other aspect, the illuminator may adjust an intensity of the light at the first wavelength in response to the area that is illuminated by the light at the first wavelength to cause lightness of the pixels that correspond to the monitoring range in the initial image to become identical to each other.

In the other aspect, the intensity of the light at the first wavelength with which the illuminator illuminates the area in the monitoring range in a case of obtaining the actual image may be a constant multiple of the intensity of the light at the first wavelength that illuminates the same area as the area in a case of obtaining the initial image.

In the other aspect, a light source that produces the light at the first wavelength may be included.

In the above aspects, the light source may be any of a semiconductor laser, a light emitting diode, a super-luminescent diode, and a semiconductor-pumped solid-state laser.

Further, in the above aspects, the illuminator may illuminate only an area whose image is captured by the image capturer in the monitoring range with the light.

Further, in the above aspects, in a case where a prescribed area in the monitoring range is designated, the image processor may detect the specific substance only in the designated area.

Further, in the above aspects, the illuminator illuminates only the prescribed area with the light at the first wave length and the light at the second wave length at different timings.

Further, in the above aspects, the substance detection device may further include a moving body detector that detects a moving body which is present in the monitoring range, and the illuminator may not illuminate the moving body which is present in the monitoring range with the light.

This enables power consumption due to unnecessary illumination to be avoided. The prescribed area means an area where the image processor detects the specific substance in the monitoring range, for example.

It should be noted that general or specific embodiments may be implemented as a system, a method, an integrated circuit, a computer program, a computer-readable recording medium such as a CD-ROM, or any selective combination thereof.

The aspects of the present invention will hereinafter be described in detail with reference to drawings.

It should be noted that all the embodiments described below merely illustrate specific examples of the present disclosure. Values, shapes, elements, steps, orders of steps, and so forth that are described in the following embodiments are merely illustrative and are not intended to limit the present disclosure. Further, the elements that are not described in the independent claims that provide the most superordinate concepts among the elements in the following embodiments will be described as arbitrary elements. Further, contents may mutually be combined in all the embodiments.

<Detailed Description of Aspects>

[First Embodiment]

FIG. 1 is a schematic configuration diagram that illustrates one example of a substance detection device 1 according to a first embodiment.

The substance detection device 1 is configured with an illuminating unit 10 and a detection unit 40. The substance detection device 1 includes a processing circuit (not illustrated) and a memory (not illustrated), for example. The memory records a program for realizing the functions of the illuminating unit 10 and the detection unit 40, for example. The processing circuit executes the program and thereby allows the illuminating unit 10 and the detection unit 40 to function.

Each of the illuminating unit 10 and the detection unit 40 may include the processing circuit. Further, each of the illuminating unit 10 and the detection unit 40 may include the memory. The memory that is included in each of the illuminating unit 10 and the detection unit 40 is also referred to as the memory of the substance detection device 1.

The illuminating unit 10 irradiates a monitoring range 50 with light at a prescribed wavelength and thereby illuminates the monitoring range 50. The detection unit 40 captures an image of the monitoring range 50 illuminated by the illuminating unit 10 and determines whether or not a substance 51 to be detected is present in the monitoring range 50 based on light and shade (lightness) of the captured image.

The illuminating unit 10 will first be described.

The illuminating unit 10 exemplified in FIG. 1 includes solid-state light sources 11a and 11b, lenses 12a and 12b, a wavelength selective light branching element 13, a scanning unit 14, and an illumination control unit 15. The solid-state light sources 11a and 11b, the lenses 12a and 12b, and the wavelength selective light branching element 13 configure a light source unit.

The solid-state light source 11a is a light source that emits light at a wavelength λ1. The solid-state light source 11b is a light source that emits light at a wavelength λ2. The solid-state light sources 11a and 11b are arranged such that a polarization plane of emission light of the solid-state light source 11a becomes parallel with the polarization plane of emission light of the solid-state light source 11b. Further, the wavelength λ1 and the wavelength λ2 are different values. For example, a wavelength that the substance 51 is likely to absorb (high absorptance) is set as "λ1", and a wavelength that the substance 51 is less likely to absorb (low absorptance) than the wavelength λ1 is set as "λ2". As the solid-state light sources 11a and 11b, a light emitting diode (LED), a semiconductor laser, a super-luminescent diode, a semiconductor-pumped solid-state laser, and so forth may be used. Because use of the light emitting diode or the super-luminescent diode leads to a wide light emission wavelength width, the wavelength band may be narrowed by using a filter.

The solid-state light sources 11a and 11b may be individually and independently configured or may be configured by implementing those together on one semiconductor chip. Further, the solid-state light sources 11a and 11b may be a wavelength tunable semiconductor laser that may change the wavelength of produced light by control from the illumination control unit 15, which will be described below, for example.

The lens 12a receives input of the light at the wavelength λ1 emitted from the solid-state light source 11a, makes the light substantially parallel light, and outputs the substantially parallel light to one side of the wavelength selective light branching element 13. The lens 12b receives input of the light at the wavelength λ2 emitted from the solid-state light source 11b, makes the light substantially parallel light, and outputs the substantially parallel light to another side of the wavelength selective light branching element 13.

In a case where the light emitted from the solid-state light sources 11a and 11b is already the substantially parallel light, the lenses 12a and 12b may be omitted from the configuration.

The wavelength selective light branching element 13 has functions of transmitting the light at the wavelength λ1 and reflecting the light at the wavelength λ2. Thus, the wavelength selective light branching element 13 transmits the substantially parallel light at the wavelength λ1 that is input from the lens 12a to the one side and outputs the substantially parallel light from the other side. Further, the wavelength selective light branching element 13 outputs the substantially parallel light at the wavelength λ2 that is input from the lens 12b to the other side from the other side while changing an angle by reflection. A dichroic mirror, a dichroic prism, or the like may be used for the wavelength selective light branching element 13.

In a case where the light emitted from the solid-state light sources 11a and 11b is already in the same light path, the wavelength selective light branching element 13 may be omitted from the configuration.

The scanning unit 14 is an optical component that receives input of each of the light emitted from the solid-state light source 11a (the light at the wavelength λ1) and the light emitted from the solid-state light source 11b (the light at the wavelength λ2) and illuminates the monitoring range 50 by two-dimensional scanning with reflected light. The scanning unit 14 is arranged on the light path of the light at the wavelength λ1 and the light at the wavelength at λ2. As the scanning unit 14, a movable mirror such as a galvanometer mirror, a polygon mirror, or a MEMS mirror driven by electromagnetic force or electrostatic force, an acousto-optic deflection element, or the like in related art may be used. For example, the scanning unit 14 includes an actuator, which is not illustrated. The actuator changes the direction (inclination) of the movable mirror. The traveling direction of the light reflected by the movable mirror may thereby be changed.

The actuator may incline the movable mirror in two different directions, for example. The actuator adjusts the inclination angle of the movable mirror and may thereby guide the reflected light to a prescribed area in the monitoring range 50.

Further, even if the light reflected by the movable mirror is capable of illuminating only a partial area of the monitoring range 50, the area illuminated by the reflected light is moved (or scanned) by adjusting the inclination angle of the movable mirror, and whole the monitoring range 50 may thereby be illuminated.

The illumination control unit 15 instructs the scanning unit 14 about the inclination angle of the movable mirror in order to guide each of the light at the wavelength λ1 and the light at the wavelength λ2 to the monitoring range 50, based on information about the monitoring range 50.

In the information about the monitoring range 50, whole a room to be a monitoring target may beforehand be set as the monitoring range 50, or a portion of the room to be the monitoring target (for example, a floor, a wall, a ceiling, a window, a door, and so forth) may be set as the monitoring range 50. The information about the monitoring range 50 may be stored in the memory of the substance detection device 1.

The illumination control unit 15 drives and controls the solid-state light source 11a when the monitoring range 50 is irradiated with the light at the wavelength λ1. Further, the illumination control unit 15 drives and controls the solid-state light source 11b when the monitoring range 50 is irradiated with the light at the wavelength λ2.

States of the driving and control are notified to the detection unit 40. The illumination control unit 15 controls scanning by the scanning unit 14, that is, the inclination angle (scanning angle) of the movable mirror so that the monitoring range 50 is two-dimensionally scanned with the irradiating light and whole the monitoring range 50 (or a predetermined portion) is thereby illuminated.

The illumination control unit 15 outputs information about the light that illuminates the monitoring range 50 to the detection unit 40. The information about the light that illuminates the monitoring range 50 is information about the wavelength of light of illumination, information about an area in the monitoring range 50 that is illuminated by the light, information about the amount of the light that illuminates the area, and so forth, for example. The information about the area in the monitoring range 50 that is illuminated by the light may be information that indicates the coordinates which correspond to the area illuminated by the light or information about the angle of the movable mirror that is inclined by the scanning unit 14.

Those pieces of information may be output each time when the wavelength of the light of illumination is changed or each time when the area in the monitoring range 50 that is illuminated by the light is changed. Further, after whole the monitoring range 50 is illuminated by the light at the wavelength λ1 or by the light at the wavelength λ2 by scanning by the scanning unit 14, the illumination control unit 15 may output the information about the light that illuminates the monitoring range 50 to the detection unit 40.

For example, when the illuminating unit 10 illuminates the monitoring range 50 with the light at the wavelength λ1, the illumination control unit 15 outputs the information about the light at the wavelength λ1 that illuminates the monitoring range 50 to the detection unit 40.

For example, when the illuminating unit 10 illuminates the monitoring range 50 with the light at the wavelength λ2, the illumination control unit 15 outputs the information about the light at the wavelength λ2 that illuminates the monitoring range 50 to the detection unit 40.

Further, the illumination control unit 15 obtains light and shade information of an image of the monitoring range 50 from the detection unit 40.

The image of the monitoring range 50 is an image (still image or moving image) in a case where the illuminating unit 10 illuminates the monitoring range 50 with each of the light at the wavelength λ1 and the light at the wavelength λ2, for example. The light and shade information of the image of the monitoring range 50 is information about the difference in lightness in the image of the monitoring range 50, for example.

The illumination control unit 15 adjusts the intensities of light output from the solid-state light sources 11a and 11b in response to the respective areas illuminated by the light from the solid-state light sources 11a and 11b in accordance with the light and shade information of the image of the monitoring range 50.

The detection unit 40 will next be described.

The detection unit 40 exemplified in FIG. 1 includes an image-capturing unit 41, an image processing unit 42, and a display unit 43. FIG. 1 illustrates a configuration in which the detection unit 40 includes the display unit 43, but the configuration is not limited to this. For example, the display unit 43 may physically be separated from the detection unit 40.

The image-capturing unit 41 is a camera that has an image-capturing element and obtains images by photographing whole (or a predetermined portion of) the monitoring range 50.

As the image-capturing element used for the image-capturing unit 41, for example, an image-capturing element such as a CCD or CMOS that uses silicon with a wavelength sensitivity band of approximately 350 nm to 1100 nm, an image-capturing element that uses InGaAs with a wavelength sensitivity band of approximately 500 nm to 2600 nm, or the like is possible.

In a case where it is desired to photograph an image only by light at a specific wavelength, a case where it is desired to photograph an image only by specifically polarized light, or the like, a wavelength filter that allows only a prescribed wavelength to pass through, a polarizing filter that allows only prescribed polarized light to pass through, or the like may be provided in front of the image-capturing unit 41 in accordance with the use. For example, two kinds of wavelength filters may be used while those wavelength filters are switched in accordance with the case where the light at the wavelength λ1 is allowed to pass through and the case where the light at the wavelength λ2 is allowed to pass through. Alternatively, the output of the solid-state light source is modulated by a certain frequency, and the camera of the image-capturing unit 41 electronically opens and closes a shutter at the certain frequency. Signals that are thereby obtained are integrated, and only the light output by the solid-state light source may thereby be selectively taken in. As described above, by modulating and emitting the light output by the solid-state light source and synchronously receiving the light on the camera side, the light at a specific wavelength or the specifically polarized light that is output by the solid-state light source may be received without the filter. Further, in the above configuration, even if there is noise light at the same wavelength or in the same polarization as the light output by the solid-state light source, the modulation frequency of the light output by the solid-state light source is caused to differ from the modulation frequency of the noise light, and only the light output by the solid-state light source may thereby be selectively taken out from the noise light. Specifically, the modulation frequency of sunlight is several Hz or lower, and the modulation frequency of light of a fluorescent lamp is 50 to 60 Hz. Thus, for example, in a case where the sunlight or the light of the fluorescent lamp is the noise light, the light output by the solid-state light source may selectively be obtained by setting the modulation frequency of the solid-state light source to 500 Hz or higher.

The image-capturing unit 41 obtains respective still images or moving images (hereinafter, simply referred to as image) in a case where the illuminating unit 10 illuminates the monitoring range 50 with the light at the wavelength λ1 and the light at the wavelength λ2 from captured images.

A description will be made about a process of obtaining an image in which the monitoring range 50 is illuminated by the light at the wavelength λ1, for example. For example, in a case where only a partial area of the monitoring range 50 is illuminated by the light at the wavelength λ1, the image-capturing unit 41 may capture an image each time when the scanning unit 14 changes the illuminated areas.

Then, after whole the monitoring range 50 may be illuminated by the light at the wavelength λ1 by scanning by the scanning unit 14, the image-capturing unit 41 may extract the image of the area that is illuminated by the light at the wavelength λ1 from captured images and perform a synthesis process.

Accordingly, the image in a case where the monitoring range 50 is illuminated by the light at the wavelength λ1 (first image) may be obtained. Alternatively, image processing unit 42 may extract the image of the area that is illuminated by the light at the wavelength λ1 from captured images and perform a synthesis process, whereby the image in a case where the monitoring range 50 is illuminated by the light at the wavelength λ1 (first image) may be obtained.

An image in a case where the illuminating unit 10 illuminates the monitoring range 50 with the light at the wavelength λ2 (second image) may be obtained by a similar process.

The image processing unit 42 receives input of each of the first image and the second image that are obtained by the image-capturing unit 41.

The image processing unit 42 determines whether the lightness in the monitoring range 50 is uniform with respect to each of the first image and the second image in an initialization process, which will be described below.

The image processing unit 42 acquires the differences between the lightness values of the pixels that correspond to the monitoring range 50 and a predetermined value with respect to the first image, and determines that there is no difference in lightness if the acquired values are in a predetermined value range, otherwise determines that there is difference in lightness. In a case where the determination is made that there is difference in lightness, the image processing unit 42 generates information that indicates that there is difference in lightness (light and shade information).

The predetermined value and the predetermined value range may arbitrarily be set by a manufacturer of the substance detection device 1 or a monitoring person who uses the substance detection device 1. The maximum value of the lightness values of the pixels that correspond to the monitoring range 50 with respect to the first image may be used as the predetermined value, for example. Further, the value range is preferably set to a range where it may be determined that there is no difference in lightness in the monitoring range 50, for example.

Further, in the initialization process, the image processing unit 42 acquires the differences between the lightness values of the pixels that correspond to the monitoring range 50 and a predetermined value with respect to the second image, and determines that there is no difference in lightness if the acquired values are in a predetermined value range, otherwise determines that there is difference in lightness. In a case where the determination is made there is difference in lightness, the image processing unit 42 generates information that indicates that there is difference in lightness (light and shade information).

The predetermined value and the predetermined value range may arbitrarily be set by the manufacturer of the substance detection device 1 or the monitoring person who uses the substance detection device 1. The maximum value of the lightness values of the pixels that correspond to the monitoring range 50 with respect to the second image may be used as the predetermined value, for example. Further, the value range is preferably set to a range where it may be determined that there is no difference in lightness in the monitoring range 50, for example.

The image processing unit 42 outputs the light and shade information in the monitoring range 50 with respect to the first image to the illuminating unit 10.

The illuminating unit 10 adjusts the amount of light in response to the area illuminated by the light at the wavelength λ1 and in accordance with the light and shade information that corresponds to the first image. The lightness in the monitoring range 50 in the first image, which is obtained by this adjustment, becomes uniform.

Further, in a case where the image processing unit 42 determines that the lightness in the monitoring range 50 is uniform with respect to the first image, the image processing unit 42 stores the first image as a first reference image in the memory of the substance detection device 1. For example, in a case where the detection unit 40 or the image processing unit 42 includes the memory, the first reference image is preferably stored in the memory.

Further, the illuminating unit 10 stores first control information that is used when the first reference image is obtained in the memory of the substance detection device 1. For example, in a case where the illuminating unit 10 or the illumination control unit 15 includes the memory, the first control information is preferably stored in the memory.

The first control information includes information about the area to be illuminated by the light at the wavelength λ1 and information about the intensity of the light at the wavelength λ1 for illuminating the area, for example.

The illuminating unit 10 (the illumination control unit 15) controls the solid-state light source 11a and the scanning unit 14 by using the first control information and may thereby illuminate the monitoring range 50 with the light at the wavelength λ1 in the same condition as the condition in which the first reference image is obtained.

Further, the illuminating unit 10 adjusts the amount of light in response to the area illuminated by the light at the wavelength λ2 and in accordance with the light and shade information that corresponds to the second image. The lightness in the monitoring range 50 in the second image, which is obtained by this adjustment, becomes uniform. The second image in which the lightness in the monitoring range 50 is uniform is stored as a second reference image in the memory of the substance detection device 1. For example, in a case where the detection unit 40 or the image processing unit 42 includes the memory, the second reference image is preferably stored in the memory.

Further, the illuminating unit 10 stores second control information that is used when the second reference image is obtained in the memory. For example, in a case where the illuminating unit 10 or the illumination control unit 15 includes the memory, the second control information is preferably stored in the memory.

The second control information includes information about the area to be illuminated by the light at the wavelength λ2 and information about the intensity of the light at the wavelength λ2 for illuminating the area, for example.

The illuminating unit 10 (the illumination control unit 15) controls the solid-state light source 11b and the scanning unit 14 by using the second control information and may thereby illuminate the monitoring range 50 with the light at the wavelength λ2 in the same condition as the condition in which the second reference image is obtained.

Further, the difference in the lightness or the ratio of the lightness of the pixels in the same position between the first reference image and the second reference image becomes the same value or a value that may be assumed as same, regardless of the position of the pixel. This value is used as a threshold value in a process of a flowchart that is explained by using FIG. 5.

In addition, in a substance detection process which will be described below, the image-capturing unit 41 obtains a first actual image in a case where the illuminating unit 10 illuminates the monitoring range 50 with the light at the wavelength λ1 by using the first control information and a second actual image in a case where the illuminating unit 10 illuminates the monitoring range 50 with the light at the wavelength λ2 by using the second control information. The first actual image is the first image obtained by the image-capturing unit 41 in the substance detection process in a case where the illuminating unit 10 illuminates the monitoring range 50 with the light at the wavelength λ1 by using the first control information. The second actual image is the second image obtained by the image-capturing unit 41 in the substance detection process in a case where the illuminating unit 10 illuminates the monitoring range 50 with the light at the wavelength λ2 by using the second control information.

Here, in a case where the respective areas illuminated by the light at the wavelength λ1 are the same area in the cases of obtaining the first reference image and obtaining the first actual image, the ratio between the respective intensities of the light at the wavelength λ1 for illuminating those areas (first ratio) is the same with respect to any area.

This means that in a case where the first reference image is obtained and where in order to obtain uniform lightness, the intensity of the light at the wavelength λ1 is changed in response to the area when plural areas included in the monitoring range 50 are illuminated, the intensity is changed in the same manner in the case where the first actual image is obtained.

Further, in a case where the respective areas illuminated by the light at the wavelength λ2 are the same area in the cases of obtaining the second reference image and obtaining the second actual image, the ratio between the respective intensities of the light at the wavelength λ2 for illuminating those areas (second ratio) is the same with respect to any area.

This means that in a case where the second reference image is obtained and where in order to obtain uniform lightness, the intensity of the light at the wavelength λ2 is changed in response to the area when plural areas included in the monitoring range 50 are illuminated, the intensity is changed in the same manner in the case where the second actual image is obtained.

In this case, the first ratio and the second ratio are preferably the same.

In this embodiment, a description will be made about an example where in a case where the respective areas illuminated by the light at the wavelength λ1 are the same area in the cases of obtaining the first reference image and obtaining the first actual image, the intensities of the light for illuminating those areas are the same (that is, the first ratio is 1:1).

In this embodiment, a description will be made about an example where in a case where the respective areas illuminated by the light at the wavelength λ2 are the same area in the cases of obtaining the second reference image and obtaining the second actual image, the intensities of the light for illuminating those areas are the same (that is, the second ratio is 1:1).

The image processing unit 42 thereafter acquires the difference in lightness between two images, which is obtained by comparing the first actual image with the second actual image, and detects the specific substance 51 that is present in the monitoring range 50 based on this difference. The difference in lightness between the pixels is a lightness difference or a lightness ratio between the pixels, for example.

The display unit 43 is an interface that is capable of displaying an image output from the image processing unit 42 (for example, a two-dimensional image whose display mode is changed in response to the difference in lightness). The display unit 43 may be a display that is provided in the image processing unit 42 or a display screen of a personal computer or a smart phone, which is separately configured from the image processing unit 42, for example. Further, the image processing unit 42 and the display unit 43 may be connected together by wired or wireless connection.

Next, an example to which the substance detection device 1 is applied will be described by further referring to the drawings.

Figure 2:
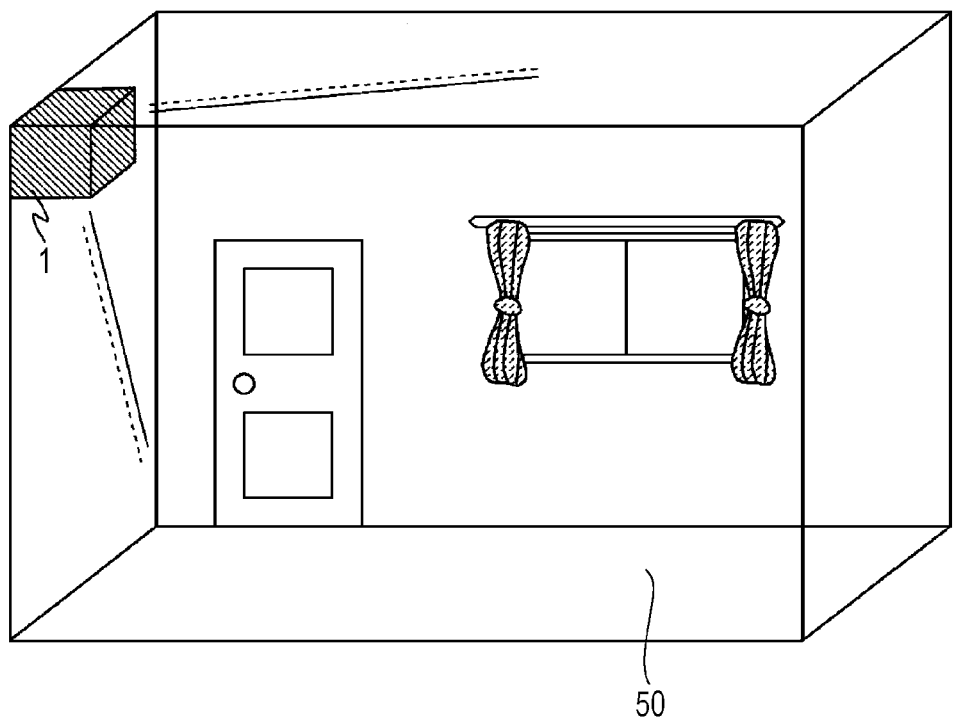
FIG. 2 is a diagram that illustrates an example where a substance detection device is installed in a room.

FIG. 2 is a diagram that illustrates an example in which the substance detection device 1 is installed in a room. In this example, whole the room (the floor, the walls, the ceiling, the window, and the door) is set as the monitoring range 50. A substance, for example, a colorless and transparent substance or water that has the same type color as the background is set as the substance 51 to be detected. It is matter of course that the substance detection device 1 may not only be installed in an indoor space such as a room but also in an outdoor space.

Figure 3:
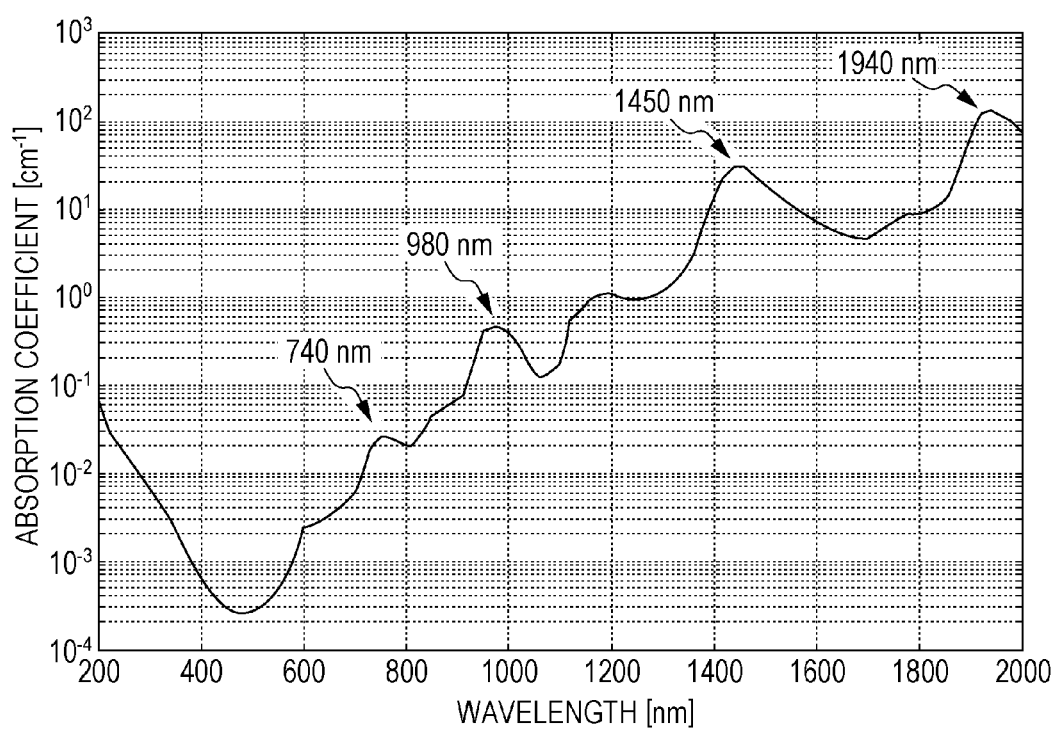
FIG. 3 is a graph that explains the absorption wavelengths of water.

FIG. 3 is a graph that explains the absorption wavelengths of water. As illustrated in FIG. 3, the light absorption peaks of water are 1940 nm, 1450 nm, 980 nm, and 740 nm. Thus, in a case where the image-capturing unit 41 uses the image-capturing element that has sensitivity in the band at a wavelength of 1000 nm or lower, for example, the light around the wavelength $\lambda 1$=980 nm is used for the solid-state light source 11$a$, and the light at the wavelength $\lambda 2$=500 nm, whose absorption coefficient is small, is used for the solid-state light source 11$b$. Infrared light at 780 to 900 nm may be used as the light at the wavelength $\lambda 2$ so that a person in the room may not perceive the illumination for substance detection.

In this example, the light at such a wavelength is used to detect whether or not water is present in the room (the monitoring range 50) or the part where water is present, as follows:

1. Initialization Process

Figure 4:
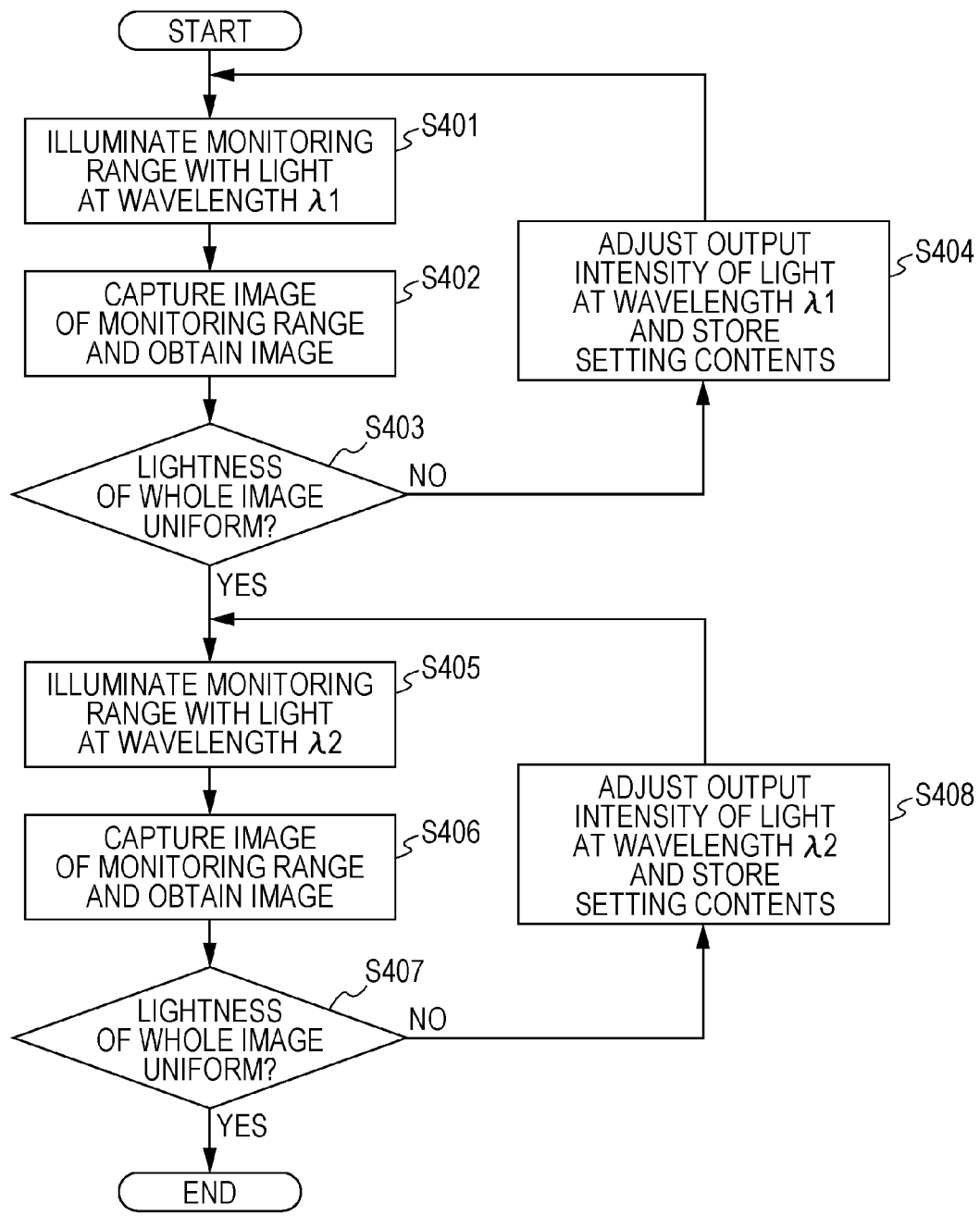
FIG. 4 is a flowchart that illustrates one example of an initialization process that is executed by the substance detection device.

FIG. 4 is a flowchart that illustrates one example of the initialization process that is executed by the substance detection device 1. The substance detection device 1 executes the initialization process before a substance detection process which will be described below. That is, the initialization process is performed before the image-capturing unit 41 obtains the first actual image and the second actual image.

The initialization process (FIG. 4) is a process of setting a reference of illumination so that an evaluation result by using the illumination does not contain an error due to factors such as characteristics, an individual difference, and a circumstance of each of the illuminating unit 10, the detection unit 40, and the room (the monitoring range 50).

For example, the following reason may be considered as the factor that causes an error. The window becomes brighter than the wall due to outside light, and the floor portion on which the light entering from the window shines also becomes brighter than the other floor portions. Further, a portion corresponding to the fluorescent lamp, which is indoor illumination, becomes bright due to light emission. The reflectance and absorptance of illumination light change in accordance with the tone or the like of a carpet or a flooring material on the floor or wallpaper. The amount of light of reflected light changes when the incident angle of the illumination light changes (in a case where the device is installed in the ceiling, the reflected light from a floor surface is intense, but the reflected light from a wall surface is less intense). A camera lens has a characteristic that light captured in a periphery of the field of view is less than the center of the field of view (due to vignetting and the cosine-fourth law).

The initialization process is performed while the substance 51 is not present in the room (the monitoring range 50). At first, the illumination control unit 15 causes the solid-state light source 11$a$ to emit the light at the wavelength $\lambda 1$, and the room is illuminated by the light at the wavelength $\lambda 1$ (step S401). The illuminated room is photographed by the image-capturing unit 41 of the detection unit 40, and the first image is thereby obtained. The obtained first image is stored in the memory of the substance detection device 1. For example, in a case where the detection unit 40 or the image processing unit 42 includes the memory, the first image is preferably stored in the memory (step S402).

The first image is analyzed by the image processing unit 42, and the light and shade in the first image are recognized.

Next, a determination is made whether the lightness of whole the first image is uniform (step S403). Specifically, the determination whether the lightness of whole the first image is uniform is made by the above-described analysis.

More specifically, the first image is divided into plural areas, and a determination is made whether the differences between the lightness values that correspond to the pixels included in the divided area and a predetermined value fall within a predetermined value range, with respect to each of the plural areas. In a case where the differences between the lightness values that correspond to the pixels and the predetermined value fall within the predetermined value range in any area, a determination is made that the lightness of whole the first image is uniform.

In a case where in any area, the differences between the lightness values that correspond to the pixels included in the area and the predetermined values do not fall within the predetermined value range, a determination is made that the lightness of whole the first image is not uniform, that is, the monitoring range 50 has a bright part or a dark part.

The size of each of the areas in the case where the first image is divided into the plural areas is preferably set as the size of the area that may be illuminated by the light at the wavelength $\lambda 1$ at a time. This is because in a case where it is determined that a certain area is a dark part, the light intensity may easily be adjusted when the area is illuminated by the light at the wavelength $\lambda 1$.

In a case where a determination is made that the lightness of whole the first image is not uniform (No in step S403), in order to allow the lightness of the captured first image to be uniform lightness in any position in the monitoring range 50, the image processing unit 42 outputs the light and shade information (the coordinates of the bright part or the dark part, the light intensity for illuminating the area that includes the coordinates, and so forth) to the illumination control unit 15. The illumination control unit 15 adjusts the output intensity of the solid-state light source 11$a$ for illuminating the area including the part that is determined to be bright or dark with the light at the wavelength $\lambda 1$ based on the received light and shade information, while synchronizing with scanning by the scanning unit 14 (step S404). The first control information that is used for this adjustment is stored as setting contents in the memory of the substance detection device 1. For example, in a case where the illuminating unit 10 or the illumination control unit 15 includes the memory, the first control information is preferably stored in the memory. The illumination control unit 15 performs the step S401 with using the first control information after the step S403.

In a case where a determination is made that the lightness of the first image is uniform (Yes in step S403), the image processing unit 42 stores the first image obtained in step S402 as the first reference image in the memory of the substance detection device 1, for example. For example, in a case where the detection unit 40 or the image processing unit 42 includes the memory, the first reference image is preferably stored in the memory.

Next, the illumination control unit 15 causes the solid-state light source 11$b$ to emit the light at the wavelength $\lambda 2$, and the room is thereby illuminated (step S405). The illuminated room is photographed by the image-capturing unit 41 of the detection unit 40, and the second image is thereby obtained. The obtained second image is stored in the memory of the substance detection device 1, for example. For example, in a case where the detection unit 40 or the image processing unit 42 includes the memory, the second image is preferably stored in the memory (step S406).

The second image is analyzed by the image processing unit 42, and the light and shade in the second image are recognized.

Next, a determination is made whether the lightness of whole the second image is uniform (step S407). Specifically, the determination whether the lightness of whole the second image is uniform is made by the above-described analysis. This determination is similar to the determination about the first image. Thus, a detailed description will not be made.

In a case where a determination is made that the lightness of whole the second image is not uniform (No in step S407), in order to allow the lightness of the captured second image to become uniform lightness in any position in the monitoring range 50, the image processing unit 42 outputs the light and shade information (the coordinates of the bright or dark part, the light intensity for illuminating the area that includes the coordinates, and so forth) to the illumination control unit 15.

The illumination control unit 15 adjusts the output intensity of the solid-state light source 11b for illuminating the area including the part that is determined as bright or dark with the light at the wavelength $\lambda 2$ based on the received light and shade information, while synchronizing with scanning by the scanning unit 14 (step S408). The second control information that is used for this adjustment is stored as the setting contents in the memory of the substance detection device 1. For example, in a case where the illuminating unit 10 or the illumination control unit 15 includes the memory, the second control information is preferably stored in the memory. The illumination control unit 15 performs step S405 with using the second control information after step S408.

In a case where a determination is made that the lightness of the second image is uniform (Yes in step S407), the image processing unit 42 stores the second image obtained in step S406 as the second reference image in the memory of the substance detection device 1. For example, in a case where the detection unit 40 or the image processing unit 42 includes the memory, the second reference image is preferably stored in the memory.

In a circumstance where the substance 51 is not present, the above-described process allows the lightness values that correspond to the pixels of the first reference image obtained by photographing the room illuminated by the light at the wavelength $\lambda 1$ by the image-capturing unit 41 to become the same value.

Further, similarly, the second reference image obtained by photographing the room illuminated by the light at the wavelength $\lambda 2$ by the image-capturing unit 41 has the same lightness value in any position in the image. For example, the amount of light of the illumination on the floor portion on which the light entering from the window shines or the portion corresponding to the fluorescent lamp of the indoor illumination is reduced, or the amount of light of the illumination in the periphery of the field of view is increased compared to the center of the field of view of the camera.

The uniform lightness to obtain is preferably the lightness values that correspond to the pixels of the brightest portions in the first image and the second image. This is for the determination about the presence of the substance 51 to be made by using the darkness of the image. In addition, in order to improve accuracy (resolution) of the determination, it is preferable to obtain uniform lightness by the highest lightness value (or a yet higher value) in the image. Further, it is sufficient that the lightness is uniform with respect to the light at each of the wavelengths. Thus, the uniform lightness in irradiation with the light at the wavelength $\lambda 1$ may not necessarily be the same as the uniform lightness in irradiation with the light at the wavelength $\lambda 2$.

Further, after the process of the flowchart of FIG. 4 is completed, the lightness values that correspond to the pixels in the first reference image stored in the memory are the same value or a value that may be assumed to be same.

This point applies to the second reference image. In a case where in the first reference image and the second reference image, the absolute value of the difference in the lightness value between the pixels corresponding to the same position or the ratio between the lightness values is set as a reference value, the reference value is the same value or a value that may be assumed to be same with respect to the pixel in any position in the monitoring range 50.

The reference value is stored in the memory of the image processing unit 42.

Figure 5:
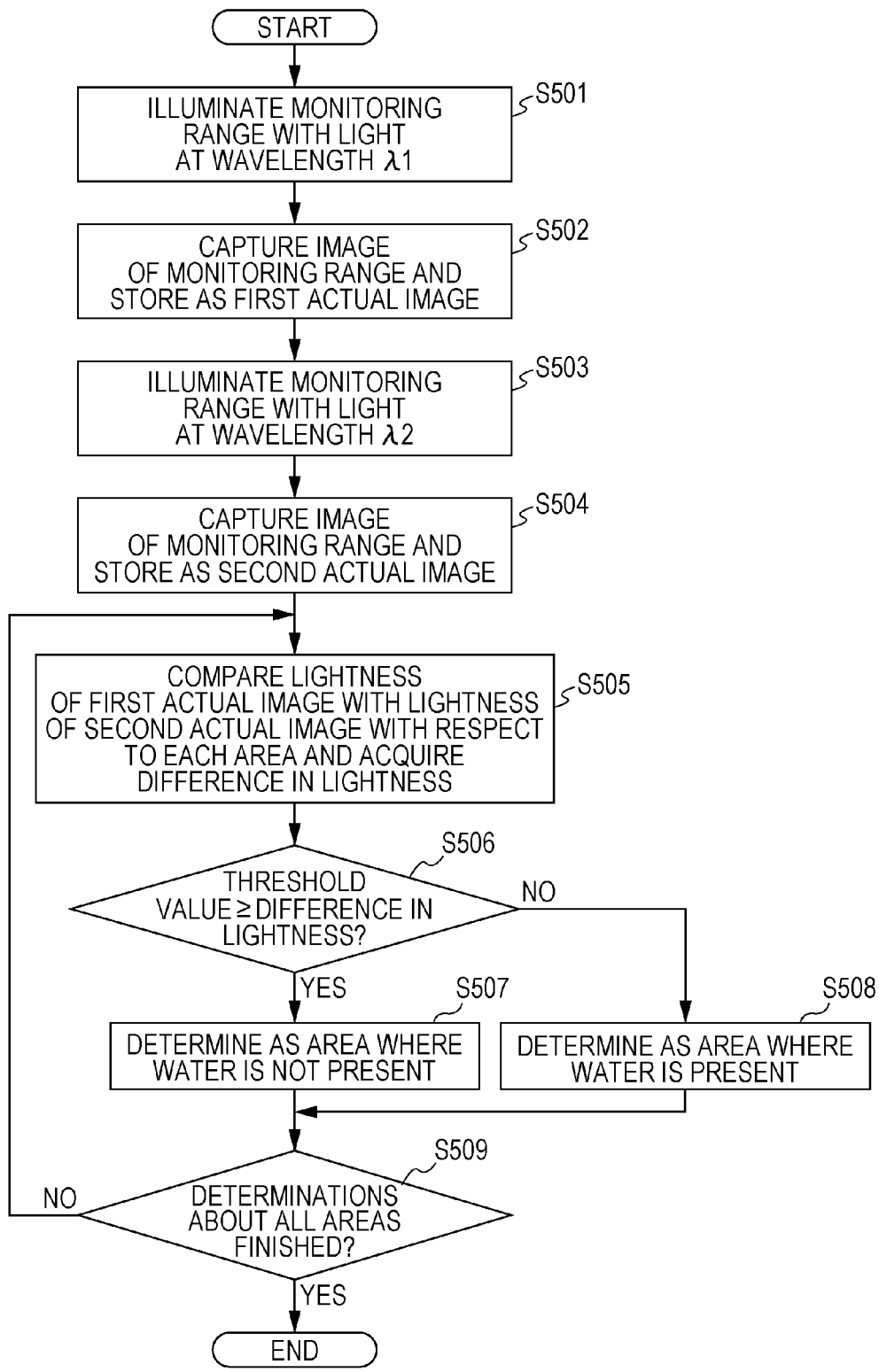
FIG. 5 is a flowchart that illustrates one example of a substance detection process that is executed by the substance detection device.

Further, the reference value is used as the value for calculating a prescribed threshold value in the substance detection process (step S506), which will be described below and is illustrated in FIG. 5.

2. Substance Detection Process

After the initialization process illustrated in FIG. 4 is completed, the substance detection process (FIG. 5) in the room (the monitoring range 50) is executed.

FIG. 5 is a flowchart that illustrates one example of the substance detection process that is executed by the substance detection device 1.

The illumination control unit 15 first causes the solid-state light source 11a to emit the light at the wavelength $\lambda 1$, and the room is thereby illuminated by the light at the wavelength $\lambda 1$ (step S501). Here, the room is illuminated by the light at the wavelength $\lambda 1$ in the same condition as the condition in which the first reference image is obtained in the initialization process. For example, the illumination control unit 15 may control the solid-state light source and the scanning unit 14 by using first control information stored in the memory. An image of the room illuminated by the light at the wavelength $\lambda 1$ is photographed by the image-capturing unit 41 of the detection unit 40, and the first actual image is thereby obtained. The obtained first actual image is stored in the memory of the substance detection device 1. For example, in a case where the detection unit 40 or the image processing unit 42 includes the memory, the first actual image is preferably stored in the memory (step S502).

Next, the illumination control unit 15 causes the solid-state light source 11b to emit the light at the wavelength $\lambda 2$, and the room is thereby illuminated by the light at the wavelength $\lambda 2$ (step S503). Here, the room is illuminated by the light at the wavelength $\lambda 2$ in the same condition as the condition in which the second reference image is obtained in the initialization process. For example, second control information stored in the memory may be used. An image of the room illuminated by the light at the wavelength $\lambda 2$ is photographed by the image-capturing unit 41 of the detection unit 40, and the second actual image is thereby obtained. The obtained second actual image is stored in the memory of the substance detection device 1. For example, in a case where the detection unit 40 or the image processing unit 42 includes the memory, the second actual image is preferably stored in the memory (step S504).

The first actual image and the second actual image that are stored in the memory are divided into respective predetermined areas by the image processing unit 42. The image processing unit 42 identifies one area in the divided areas of the first actual image and a corresponding area in the divided areas of the second actual image. The identified area in the first actual image and the corresponding area in the second actual image are partial image corresponding to an identical area which is a part of the monitoring range 50. The identified area in the first actual image and the corresponding area in the second actual image are compared by the image processing unit 42. The difference in lightness (lightness difference or lightness ratio) between the images is thereby calculated (step S505). Here, in a case where water is present in the room (the monitoring range 50), the light at the wavelength λ1 is likely to be absorbed by water. Thus, in the first actual image, the lightness in a case of illuminating the part where water is present with the light at the wavelength λ1 becomes lower (that is, darker) than the lightness in a case of illuminating the part where water is not present with the light at the wavelength λ1.

That is, in the actual image, if there is the part where water is present in the monitoring range 50, the part is expressed darker than the other parts.

On the other hand, the light at the wavelength λ2 is less likely to be absorbed. Thus, the lightness of the part where the water is present is expressed not very differently from the other parts in the second actual image. Accordingly, the difference in lightness between the two images is assessed, and a determination may thereby be made whether or not water is present in the room (the monitoring range 50). Further, this determination is performed with respect to each of the predetermined areas, and the part where water is present may thereby be specifically detected.

Thus, in a certain area, the lightness values corresponding to the pixels of the first image, which correspond to the area, are subtracted from or divided by the lightness values corresponding to the pixels of the second image, which correspond to the area, and the difference in lightness (lightness difference or lightness ratio) between the two images of the area may thereby be calculated.

Then, a determination is made whether all the differences in lightness between the pixels included in the area are a prescribed threshold value or lower (step S506). In a case where all the differences in lightness between the pixels included in the area are a prescribed threshold value or lower (Yes in step S506), a determination is made that water is not present because the light at the wavelength λ1 is not absorbed but reflected in the area (step S507). In a case where the difference in lightness of any of the pixels included in the area exceeds the prescribed threshold (No in step S506), a determination is made that water is present because the light at the wavelength λ1 is absorbed in the area (step S508). The prescribed threshold value in this case is the reference value, for example.

The image processing unit 42 determines whether the process in step S506 is performed with respect to all of the plural divided areas in the first actual image (step S509). In a case where the image processing unit 42 determines that the process in step S506 is not performed with respect to all of the plural divided areas in the first actual image (No in step S509), the image processing unit 42 identifies one area in the plural divided areas in the first actual image, for which the process in step S506 is not performed, and corresponding one area in the plural divided areas in the second actual image. And the image processing unit 42 returns to step S505 to determine whether water is present or not with respect to the identified area. In a case where the image processing unit 42 determines that the process in step S506 is performed with respect to all of the plural divided areas in the first actual image (Yes in step S509), the image processing unit 42 ends the substance detection process illustrated in FIG. 5. According to the substance detection process, the part where water is present in the room (the monitoring range 50) may be identified with high accuracy.

Further, the image processing unit 42 generates the images of the monitoring range 50 that display the area with the determination that water is present and the area with the determination that water is not present in different display modes as necessary and displays the images on the display unit 43.

The processes in steps S505 to S508 are performed with respect to each of the plural divided areas, and a determination is thereby made whether or not water is present with respect to each of the areas. However, embodiments do not have to be limited to this.

For example, if a determination is made whether or not water is present with respect to each of the pixels included in each of the areas, a determination may thereby be made whether or not water is present with respect to each of the positions that correspond to the pixels. This enables the part where water is present to be identified with higher accuracy.

In a case where the intensity of the light at the wavelength λ1 for illuminating the same area is different between the obtainment of the first reference image and the obtainment of the first actual image (that is, the above-described first ratio is not 1:1) and the intensity of the light at the wavelength λ2 for illuminating the same area is different between the obtainment of the second reference image and the obtainment of the second actual image (that is, the above-described second ratio is not 1:1), the reference value that corresponds to the above-described lightness difference has to be changed in response to the above-described first ratio (or the second ratio).

As described above, the substance detection device 1 according to the first embodiment compares the first image of the monitoring range 50 that is illuminated by the light at the wavelength λ1 with the second image of the monitoring range 50 that is illuminated by the light at the wavelength λ2, acquires the difference in lightness, and performs evaluation.

Thus, a wavelength that the substance 51 to be detected is likely to absorb (the absorption amount is large) is set as the wavelength λ1, and the wavelength that is less likely to be absorbed (the absorption amount is small) is set as the wavelength λ2. Accordingly, determinations about presence or absence of the substance 51 and the part where the substance 51 is present may easily be made by using the difference in lightness.

The substance detection device 1 uses the light at the wavelength that is less likely to be absorbed, other than the absorption wavelengths, in addition to the light at the wavelength that is likely to be absorbed by the substance 51 as a target of a determination about presence or absence. Thus, the variation (unevenness) in the amount of light due to the shape, the surface roughness, and dirt on the surface of the substance 51 may be corrected by using detection results by the wavelength that is less likely to be absorbed. Accordingly, this method that uses plural wavelengths enables the determinations about presence or absence of the substance 51 and the part where the substance 51 is present to be made with higher accuracy than a case where only the wavelength that the substance 51 is likely to absorb is used.

For example, a position where it is determined that the substance 51 is present (for example, the location of a floor surface on which water is spilt) may be notified to the monitoring person via the display unit 43. This allows the monitoring person to take a measure or the like so that a person does not slip in the location where water is spilt. For example, the monitoring person may take measures such as restricting entry to the location where water is spilt and causing a cleaning robot to automatically clean the location where water is spilt.

In the above embodiment, a description is made about an example of detecting water as a substance. However, colorless and transparent substances and substances that have the same type color as the background, for example, oil and fungi, may be detected. As one example, a certain kind of mineral oil absorbs light at a wavelength of 3450 nm but does not absorb light at a wavelength of 2500 nm, and a certain kind of fungus absorbs light at a wavelength of 405 nm but does not absorb light at a wavelength of 500 nm or higher. Accordingly, the wavelengths λ1 and λ2 of the light emitted by the solid-state light sources 11a and 11b are appropriately set, and oil and fungi may thereby be detected similarly to water.

Further, in the above embodiment, the initialization process is performed, and each of the first reference image and the second reference image of the monitoring range 50 thereby obtains uniform lightness. This provides an advantage of using only one threshold value for the determination about presence or absence of the substance in the substance detection process. Meanwhile, if plural threshold values may be obtained for the image of the monitoring range 50 (for example, if m×n threshold values that correspond to m×n pixels which configure the image of the monitoring range 50 may be obtained), the determination about presence or absence of the substance may be made with an image where lightness is not uniform, and the initialization process illustrated in FIG. 4 may thus be omitted.

In addition, as the illuminating unit 10 of the substance detection device 1, the configuration in which the monitoring range 50 is irradiated with the light emitted from the solid-state light sources 11a and 11b by the two-dimensional scanning by using the scanning unit 14 is described.

However, without using the scanning unit 14, the light source unit itself that includes the solid-state light sources 11a and 11b, the lenses 12a and 12b, and the wavelength selective light branching element 13 may be moved in two-dimensional directions to illuminate the monitoring range 50 with light.

[Second Embodiment]

In the above first embodiment, a description is made about the substance detection device 1 that uses the two solid-state light sources 11a and 11b which emit light at different wavelengths.

In a second embodiment, a description will be made about a device that may detect the substance by using only one solid-state light source.

Figure 6:
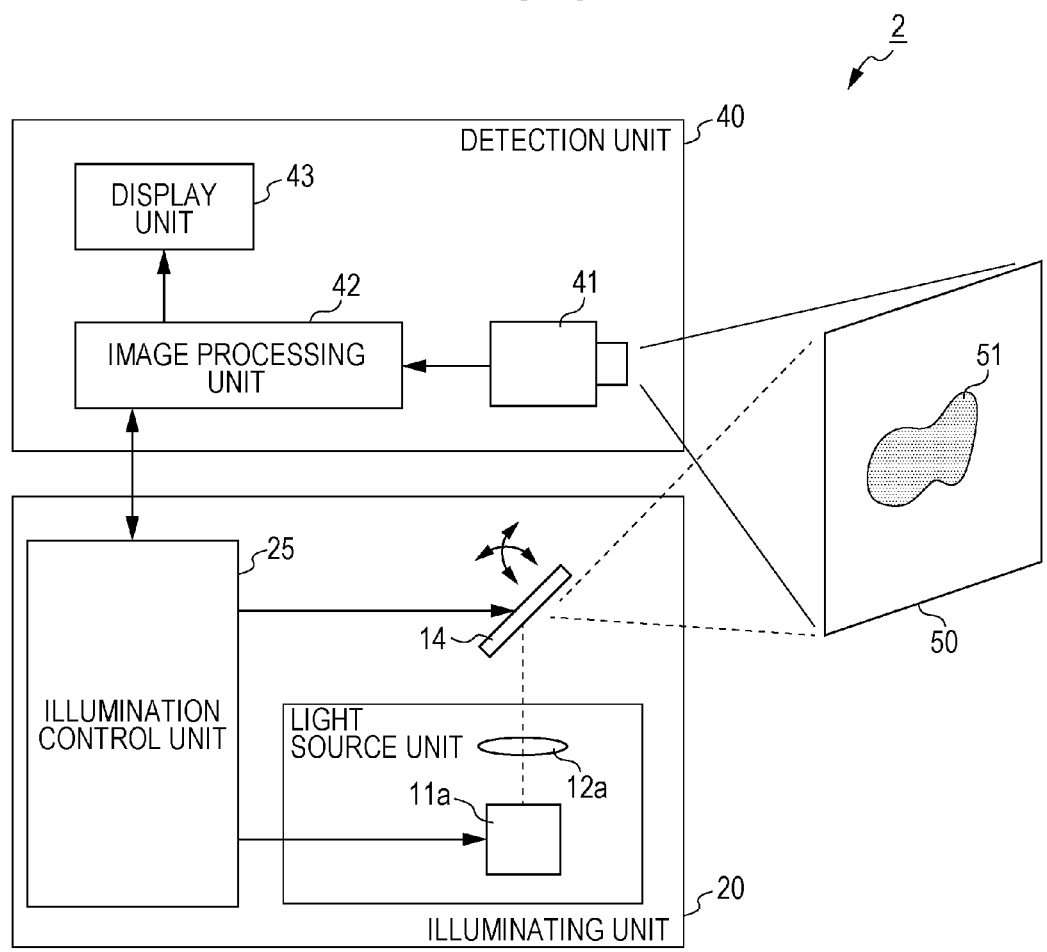
FIG. 6 is a schematic configuration diagram that illustrates one example of a substance detection device according to a second embodiment.

FIG. 6 is a schematic configuration diagram that illustrates one example of a substance detection device 2 according to the second embodiment.

The substance detection device 2 is configured with an illuminating unit 20 and the detection unit 40. The illuminating unit 20 exemplified in FIG. 6 includes the solid-state light source 11a, the lens 12a, the scanning unit 14, and an illumination control unit 25. In brief, the illuminating unit 20 has the configuration in which the solid-state light source 11b, the lens 12b, and the wavelength selective light branching element 13 are omitted from the illuminating unit 10, which is described in the first embodiment. The detection unit 40 exemplified in FIG. 6 includes the image-capturing unit 41, the image processing unit 42, and the display unit 43.

The solid-state light source 11a is a light source that emits light at a wavelength λ1. The wavelength λ1 is set to a wavelength that the substance 51 is more likely to absorb than a prescribed value (with high absorptance), for example. As the solid-state light source 11a, a light emitting diode (LED), a semiconductor laser, a super-luminescent diode, a semiconductor-pumped solid-state laser, and so forth may be used. Because use of the light emitting diode or the super-luminescent diode leads to a wide light emission wavelength width, the wavelength band may be narrowed by using a filter.

The lens 12a receives input of the light at the wavelength λ1 emitted from the solid-state light source 11a, makes the light substantially parallel light, and outputs the substantially parallel light to the scanning unit 14. In a case where the light emitted from the solid-state light source 11a is already the substantially parallel light, the lens 12a may be omitted from the configuration.

The scanning unit 14 is an optical component that receives input of the light emitted from the solid-state light source 11a and illuminates the monitoring range 50 by two-dimensional scanning with reflected light. As the scanning unit 14, a galvanometer mirror, a polygon mirror, a MEMS mirror driven by electromagnetic force or electrostatic force, an acousto-optic deflection element, or the like in related art may be used.

The illumination control unit 25 drives and controls the solid-state light source 11a when the monitoring range 50 is irradiated with the light at the wavelength λ1. The illumination control unit 25 controls the scanning angle of the scanning unit 14 so that the monitoring range 50 is two-dimensionally scanned with the irradiating light and whole the monitoring range 50 (or a predetermined portion) is thereby illuminated.

Further, the illumination control unit 25 obtains the light and shade information of an image of the monitoring range 50 from the detection unit 40 and adjusts the intensity of the light emitted from the solid-state light source 11a as necessary.

The image-capturing unit 41 is a camera that has an image-capturing element and obtains images by photographing whole (or a predetermined portion of) the monitoring range 50. As the image-capturing element used for the image-capturing unit 41, for example, an image-capturing element such as a CCD or CMOS that uses silicon with a wavelength sensitivity band of approximately 350 nm to 1100 nm, an image-capturing element that uses InGaAs with a wavelength sensitivity band of approximately 500 nm to 2600 nm, or the like is possible.

In a case where it is desired to photograph an image only by light at a specific wavelength, a case where it is desired to photograph an image only by specifically polarized light, or the like, a wavelength filter that allows only a prescribed wavelength to pass through, a polarizing filter that allows only prescribed polarized light to pass through, or the like may be provided in front of the image-capturing unit 41 in accordance with the use.

The image-capturing unit 41 obtains an image in a case where the illuminating unit 20 illuminates the monitoring range 50 with the light at the wavelength λ1 (first image) from captured images. The process of obtaining the first image is described in the first embodiment. Thus, a detailed description thereof will not be made here.

The image processing unit 42 receives input of the first image obtained by the image-capturing unit 41.

The image processing unit 42 determines whether the lightness in the monitoring range 50 is uniform with respect to the first image in an initialization process, which will be described below. The details of the determination are described in the first embodiment. Thus, a detailed description thereof will not be made here.

Further, in a case where the image processing unit 42 determines that the lightness in the monitoring range 50 is uniform with respect to the first image, the image processing unit 42 stores the first image as an initial image in the memory of the substance detection device 1. For example, in a case where the detection unit 40 or the image processing unit 42 includes the memory, the initial image is preferably stored in the memory.

The display unit 43 is an interface that is capable of displaying an image output from the image processing unit 42 (for example, a two-dimensional image whose display mode is changed in response to the difference in lightness). The display unit 43 may be a display that is provided in the image processing unit 42 or a display screen of a personal computer or a smart phone, which is separately configured from the image processing unit 42, for example. Further, the image processing unit 42 and the display unit 43 may be connected together by wired or wireless connection.

Next, an example to which the substance detection device 2 is applied will be described by further referring to the drawings.

Similarly to the above first embodiment, an example will be discussed where the substance detection device 2 is installed in a room. In the second embodiment, detection of whether or not water is present in the room (the monitoring range 50) or of a part where water is present is performed as follows. It is matter of course that the substance detection device 2 may not only be installed in an indoor space such as a room but also in an outdoor space.

1. Initialization Process

Figure 7:
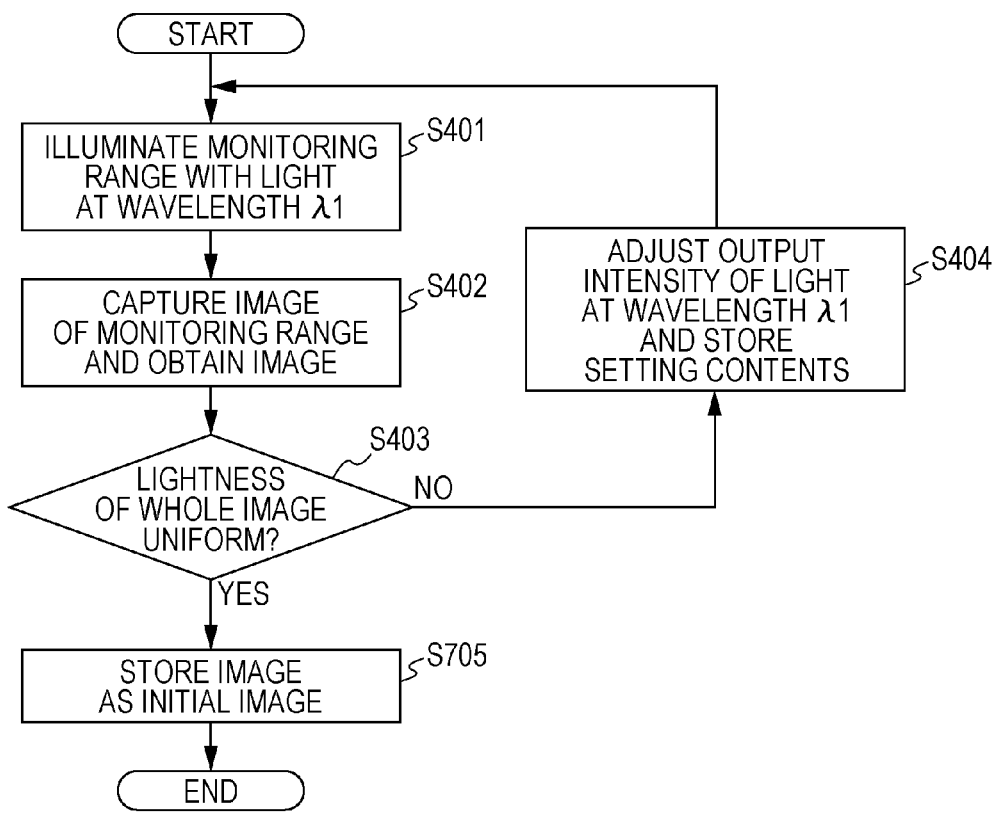
FIG. 7 is a flowchart that illustrates one example of an initialization process that is executed by the substance detection device.

FIG. 7 is a flowchart that illustrates one example of the initialization process that is executed by the substance detection device 2.

The initialization process (FIG. 7) is a process of setting a reference of illumination so that an evaluation result by using the illumination does not contain an error due to factors such as characteristics, an individual difference, and a circumstance of each of the illuminating unit 20, the detection unit 40, and the room (the monitoring range 50).

In FIG. 7, as for step S401 to step S404, the substance detection device 1, the illuminating unit 10, and the illumination control unit 15 may be substituted by the substance detection device 2, the illuminating unit 20, and the illumination control unit 25, respectively, in the first embodiment, particularly the contents described with FIG. 4. Thus, a detailed description thereof will not be made here.

In a case where a determination is made that the lightness of whole the obtained image is uniform in step S403 (Yes in step S403), the image processing unit 42 stores the first image obtained in step S402 as the initial image in the memory of the substance detection device 2, for example (step S705). For example, in a case where the detection unit 40 or the image processing unit 42 includes the memory, the initial image is preferably stored in the memory.

The above-described processes allow the initial image obtained by photographing the room illuminated by the light at the wavelength λ1 by the image-capturing unit 41 to have the same lightness value in any position in the image.

The uniform lightness to obtain is preferably the highest lightness value among the values indicating lightness that correspond to the pixels included in the captured image of the monitoring range 50. This is for the determination about the presence of the substance 51 to be made by using the darkness of the image. In addition, in order to improve accuracy (resolution) of the determination, it is preferable to obtain uniform lightness by the highest lightness value (or a yet higher value) in the image.

Figure 8:
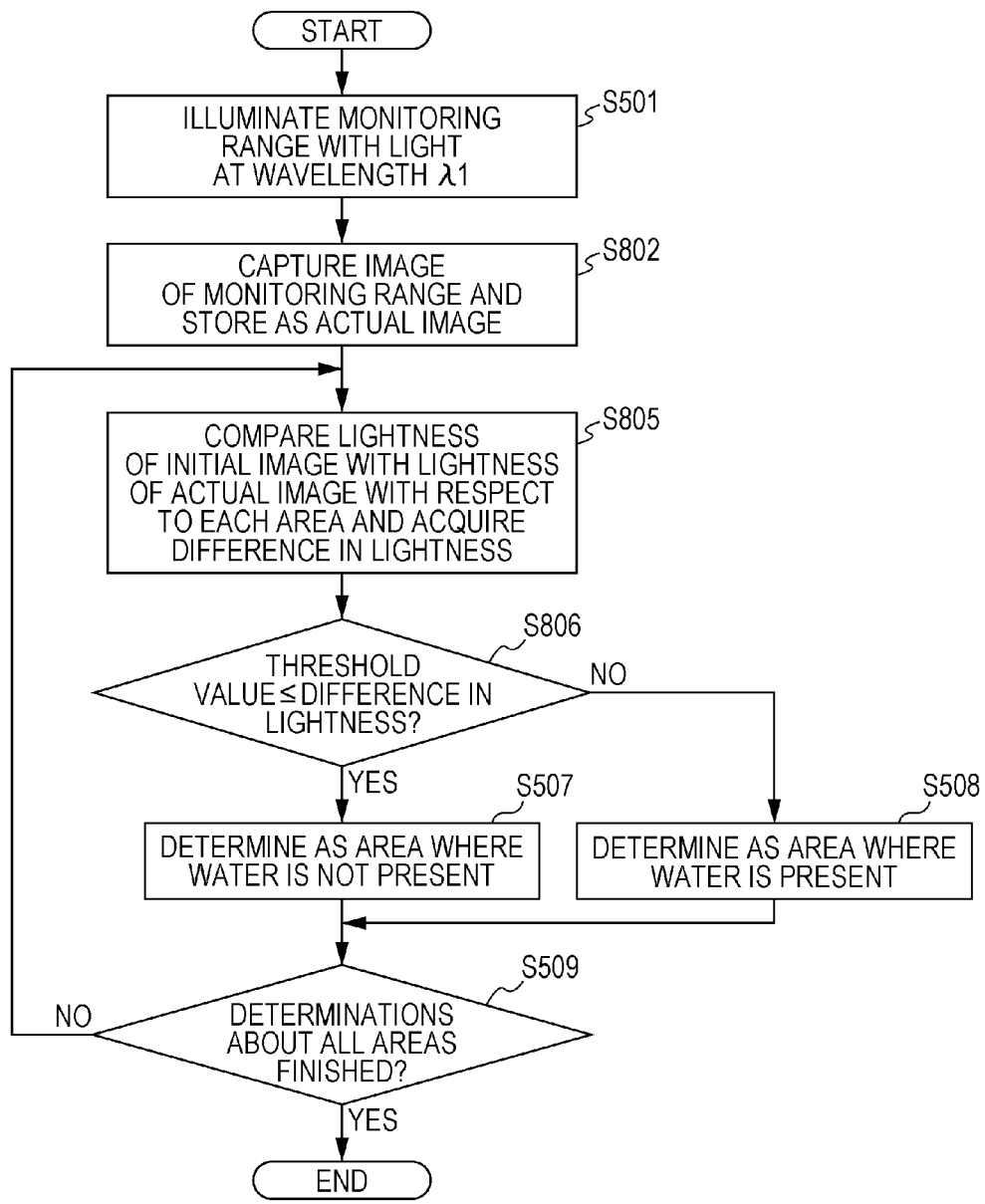
FIG. 8 is a flowchart that illustrates one example of the substance detection process that is executed by the substance detection device.

Further, the image processing unit 42 stores the lightness value that corresponds to any of the pixels included in the initial image as a reference value in the memory. The reference value is used in the substance detection process, which will be described below and is illustrated in FIG. 8.

In addition, in the substance detection process which will be described below, the image processing unit 42 obtains an actual image in a case where the illuminating unit 20 illuminates the monitoring range 50 with the light at the wavelength λ1 by using the first control information.

Here, in a case where the respective areas illuminated by the light at the wavelength λ1 are the same area in the cases of obtaining the initial image and obtaining the actual image, the ratio between the respective intensities of the light at the wavelength λ1 for illuminating those areas is the same with respect to any area.

This means that in a case where the initial image is obtained and where in order to obtain uniform lightness, the intensity of the light at the wavelength λ1 is changed in response to the area when plural areas included in the monitoring range 50 are illuminated, the intensity is changed in the same manner in the case where the actual image is obtained.

In this embodiment, a description will be made about an example where in a case where the respective areas illuminated by the light at the wavelength λ1 are the same area in the cases of obtaining the initial image and obtaining the actual image, the intensities of the light for illuminating those areas are the same (that is, the above-described ratio is 1:1).

2. Substance Detection Process

After the initialization process illustrated in FIG. 7 is completed, the substance detection process in the room (the monitoring range 50) is executed.

FIG. 8 is a flowchart that illustrates one example of the substance detection process that is executed by the substance detection device 2.

The illumination control unit 25 causes the solid-state light source 11a to emit the light at the wavelength λ1, and the room is thereby illuminated by the light at the wavelength λ1 (step S501). Here, the room is illuminated by the light at the wavelength λ1 in the same condition as the condition in which the initial image is obtained in the initialization process. For example, the illumination control unit 25 may control the solid-state light source 11a and the scanning unit 14 by using first control information stored in the memory. An image of the room illuminated by the light at the wavelength λ1 is photographed by the image-capturing unit 41 of the detection unit 40, and the actual image is thereby obtained. The actual image is the first image obtained by the image-capturing unit 41. The obtained actual image is stored in the memory of the substance detection device 2. For example, in a case where the detection unit 40 or the image processing unit 42 includes the memory, the actual image is preferably stored in the memory (step S802).

The actual image and the initial image that are stored in the memory are divided into respective predetermined areas by the image processing unit 42. The image processing unit 42 identifies one area in the divided areas of the actual image and a corresponding area in the divided areas of the initial image. The identified area in the actual image and the corresponding area in the initial image are partial image corresponding to an identical area which is a part of the monitoring range 50. The identified area in the actual image and the corresponding area in the initial image are compared by the image processing unit 42. The difference in lightness (lightness difference or lightness ratio) between the images is thereby calculated (step S805). Here, in a case where water is present in the room (the monitoring range 50), the light at the wavelength λ1 is likely to be absorbed by water.

Thus, in the actual image, the lightness in a case of illuminating the part where water is present with the light at the wavelength λ1 becomes lower (that is, darker) than the lightness in a case of illuminating the part where water is not present with the light at the wavelength λ1.

That is, in the actual image, if there is the part where water is present in the monitoring range 50, the part is expressed darker than the other parts.

Accordingly, the difference in lightness (lightness difference or lightness ratio) between the actual image and the initial image is assessed, and a determination may thereby be made whether or not water is present in the room (the monitoring range 50). Further, this determination is performed with respect to each of the predetermined areas, and the part where water is present may thereby be specifically detected.

Thus, in a certain area, the lightness values corresponding to the pixels of the initial image, which are included in the area, are subtracted from or divided by the lightness values corresponding to the pixels of the actual image, which are included in the area, and the difference in lightness (lightness difference or lightness ratio) between the two images may thereby be calculated. Then, a determination is made whether the calculated value is a prescribed threshold value or higher (step S806).

In a case where all the differences in lightness between the pixels included in the area are the prescribed threshold value or higher (Yes in step S806), a determination is made that water is not present because the light at the wavelength λ1 is not absorbed but reflected in the area (step S507). In a case where the difference in lightness is lower than the prescribed threshold (No in step S806), a determination is made that water is present because the light at the wavelength λ1 is absorbed in the area (step S508). Here, the prescribed threshold value in this case is 0 in the case of calculating the lightness difference and is 1 in the case of calculating the lightness ratio, for example.

The image processing unit 42 determines whether the process in step S806 is performed with respect to all of the plural divided areas in the actual image (step S509). In a case where the image processing unit 42 determines that the process in step S806 is not performed with respect to all of the plural divided areas in the actual image (No in step S509), the image processing unit 42 identifies one area in the plural divided areas in the actual image, for which the process in step S806 is not performed, and corresponding one area in the plural divided areas in the initial image. And the image processing unit 42 returns to step S805 to determine whether water is present or not with respect to the identified area. In a case where the image processing unit 42 determines that the process in step S806 is performed with respect to all of the plural divided areas in the actual image (Yes in step S509), the image processing unit 42 ends the substance detection process illustrated in FIG. 8. According to the substance detection process, the part where water is present in the room (the monitoring range 50) may be identified with high accuracy. The image processing unit 42 may not perform a process of dividing the initial image into plural areas because values of lightness of the pixels in the initial image become identical to each other regardless of the position of the pixel. In this case a value of lightness of any one of the pixels in the initial image is referred to as a value of lightness of each of the pixels in the initial image.

The processes in steps S805, S806, S507, and S508 are performed with respect to each of the plural divided areas, and a determination is thereby made whether or not water is present with respect to each of the areas. However, embodiments do not have to be limited to this.

For example, if a determination is made whether or not water is present with respect to each of the pixels included in each of the areas, a determination may thereby be made whether or not water is present with respect to each of the positions that correspond to the pixels. This enables the part where water is present to be identified with higher accuracy.

In a case where the intensity of the light at the wavelength λ1 for illuminating the same area is different between the obtainment of the initial image and the obtainment of the actual image (that is, the above-described ratio is not 1:1), the reference value that corresponds to the above-described lightness difference has to be changed in response to the above-described ratio.

Further, the image processing unit 42 generates the images of the monitoring range 50 that display the area with the determination that water is present and the area with the determination that water is not present in different display modes as necessary and displays the images on the display unit 43.

As described above, the substance detection device 2 according to the second embodiment compares the actual image of the monitoring range 50 that is illuminated by the light at the wavelength λ1 with the initial image in a state where the specific substance 51 is not present, acquires the difference in lightness (lightness difference or lightness ratio) between the two images, and performs evaluation.

Thus, a wavelength that the substance 51 to be detected is likely to absorb (the absorption amount is large) is set as the wavelength λ1, and determinations about presence or absence of the substance 51 and the part where the substance 51 is present may easily be made by using the difference in lightness (lightness difference or lightness ratio).

In the above embodiment, a description is made about an example of detecting water as a substance that is difficult to distinguish only by the image captured by the image-capturing unit 41. However, colorless and transparent substances and substances that have the same type color as the background, for example, oil and fungi, may be detected. As one example, a certain kind of mineral oil absorbs light at a wavelength of 3450 nm but does not absorb light at a wavelength of 2500 nm, and a certain kind of fungus absorbs light at a wavelength of 405 nm but does not absorb light at a wavelength of 500 nm or higher. Accordingly, the wavelengths λ1 of the light emitted by the solid-state light source 11a is appropriately set, and oil and fungi may thereby be detected similarly to water.

Further, in the above embodiment, the initialization process is performed, and the initial image of the monitoring range 50 thereby obtains uniform lightness.

This provides an advantage of using only one threshold value for the determination about presence or absence of the substance in the substance detection process. Meanwhile, if plural threshold values may be obtained for the image of the monitoring range 50 (for example, if m×n threshold values that correspond to m×n pixels which configure the image may be obtained), the determination about presence or absence of the substance may be made with an image where lightness is not uniform, and the processes of steps S403 and S404 of the initialization process of FIG. 7 may thus be omitted.

In addition, as the illuminating unit 20 of the substance detection device 2, the configuration in which the monitoring range 50 is irradiated with the light emitted from the solid-state light source 11a by the two-dimensional scanning by using the scanning unit 14 is described.

However, without using the scanning unit 14, the light source unit itself that includes the solid-state light source 11a and the lens 12a may be moved in two-dimensional directions to illuminate the monitoring range 50 with light.

Several application examples of the above-described substance detection device 1 or 2 will hereinafter be described.

APPLICATION EXAMPLE 1

Figure 9:
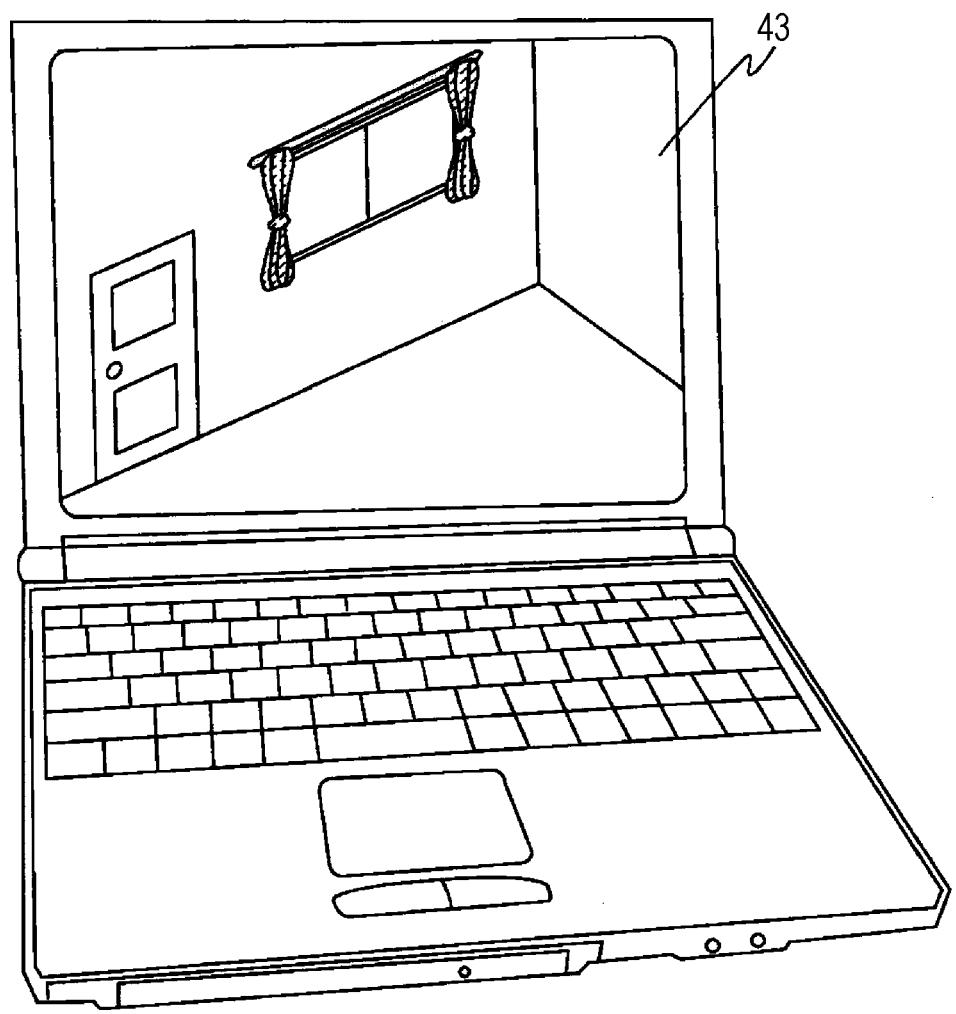
FIG. 9 is a diagram that illustrates one example where an image captured by an image-capturing unit is displayed on a display unit.

The monitoring range 50 whose image is captured by the image-capturing unit 41 may be checked by the monitoring person by the image displayed on the display unit 43. FIG. 9 is a diagram that illustrates one example where an image captured by the image-capturing unit 41 is displayed on the display unit 43. The monitoring person may designate only "the area for detecting the substance (detection area)" in the monitoring range 50 as a prescribed area while checking the image displayed on the display unit 43. Alternatively, the monitoring person may designate a change of the monitoring range 50 so as to set only the detection area as the monitoring range 50 while checking the image displayed on the display unit 43.

For example, in a case where the display of a terminal device such as a personal computer or a smart phone, which is connected with the detection unit 40 by wired or wireless connection, is the display unit 43, the above-described designation is performed by using an input instrument (not illustrated). The input instrument is a keyboard or a mouse, for example. Further, in a case where the display is a touch panel display, the above-described designation may be performed by designating an image displayed on the display.

For example, in a case where the monitoring range 50 is a room, it is possible to designate only a floor area, a wall area, or the like as the prescribed area. Information about the prescribed area or the change of the monitoring range 50 that are designated is sent from the terminal device to the substance detection device 1 or 2 and stored in the memory of the substance detection device 1 or 2. For example, in a case where the detection unit 40 or the image processing unit 42 includes the memory, the information about the prescribed area or the change of the monitoring range 50 that are designated is preferably stored in the memory.

The image processing unit 42 uses those pieces of information stored in the memory and thereby performs the substance detection process with respect to only the prescribed area or the changed monitoring range 50. Accordingly, the substance detection process for unnecessary areas may be avoided. The information about the prescribed area or the change of the monitoring range 50 that are designated may be output to the illuminating unit 10 or 20. Consequently, the illuminating unit 10 or 20 may illuminate only the detection area or the changed monitoring range 50 with light. This enables power consumption due to unnecessary illumination to be avoided.

APPLICATION EXAMPLE 2

Figure 10:
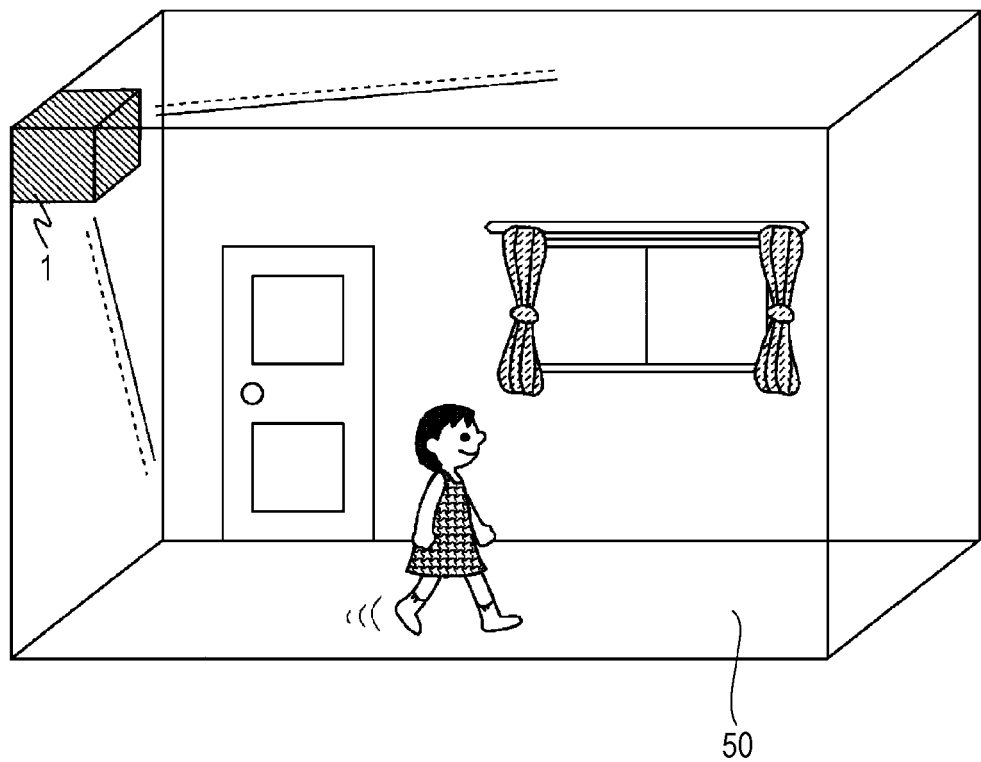
FIG. 10 is a diagram that illustrates one example where a moving object is present in a room in which the substance detection device is installed.

In a case where a moving object such as a machine or a person (referred to as moving body) is present in the monitoring range 50, the area where the moving body is present may be designated as "an area where the substance is not detected (non-detection area)". FIG. 10 is a diagram that illustrates one example where the moving body is present in a room in which the substance detection device 1 is installed. The example illustrated by FIG. 10 illustrates a person who is in the room in which the substance detection device 1 is installed as an example of the moving body.

For example, the detection unit 40 is allowed to include a configuration that is capable of detecting motion, and extraction and tracing of the moving body are performed by using the difference between two images captured at a prescribed time interval. Accordingly, the moving body in the monitoring range 50 may be detected, and the area where the detected moving body is positioned may be specified as the non-detection area (the prescribed area). The image processing unit 42 does not detect whether or not the substance 51 is present with respect to the area specified as the non-detection area.

Information about the detected moving object is stored in the memory of the substance detection device 1 or 2. For example, in a case where the detection unit 40 or the image processing unit 42 includes the memory, the information about the moving body is preferably stored in the memory.

The image processing unit 42 may choose not to perform the substance detection process in the specified non-detection area by using the information about the moving body. This enables errors due to the moving body to be removed. The information about the detected moving body may be output to the illuminating unit 10 or 20. Consequently, the illuminating unit 10 or 20 may choose not to illuminate the non-detection area with light in the substance detection process. This enables power consumption due to unnecessary illumination to be avoided.

APPLICATION EXAMPLE 3

In a case where a photodegradation substance that degrades by the illumination from the illuminating unit 10 or 20 is present in the monitoring range 50, it is preferable not to illuminate the photodegradation substance.

The monitoring range 50 whose image is captured by the image-capturing unit 41 may be checked by the monitoring person by the image displayed on the display unit 43 (see FIG. 9). Thus, the monitoring person may designate the range corresponding to the photodegradation substance as "an area that is not illuminated (non-illuminated area)" while checking the image displayed on the display unit 43. Alternatively, the monitoring person may designate a change of the monitoring range 50 so that the monitoring range 50 does not include the non-illuminated area, while checking the image displayed on the display unit 43.

Information about the range corresponding to the photodegradation substance (the prescribed area) or the changed monitoring range 50 is stored in the memory of the substance detection device 1 or 2. For example, in a case where the illuminating unit 10 (the illumination control unit 15) or the illuminating unit 20 (the illumination control unit 25) includes the memory, the information about the range corresponding to the photodegradation substance (the prescribed area) or the changed monitoring range 50 is preferably stored in the memory.

The illuminating unit 10 or 20 may perform control not to illuminate the non-illuminated area with light based on the information about the range corresponding to the photodegradation substance or the changed monitoring range 50. This enables degradation of the photodegradation substance to be avoided. The information about the range corresponding to the photodegradation substance or the changed monitoring range 50 is stored also in the memory of the detection unit 40 or the image processing unit 42, and the non-illuminated area may thereby be processed as the non-detection area. This enables errors due to the photodegradation substance to be removed.

APPLICATION EXAMPLE 4

In a case where an area that specularly reflects the illumination from the illuminating unit 10 or 20 is present in the monitoring range 50 or a case where a substance that is different from the detection target and specularly reflects the illumination is present, it is preferable not to illuminate this specular reflection area or substance.

The monitoring range 50 whose image is captured by the image-capturing unit 41 may be checked by the monitoring person by the image displayed on the display unit 43 (see FIG. 9). Thus, the monitoring person may designate the range corresponding to the specular reflection area or substance as "the area that is not illuminated (non-illuminated area)" while checking the image displayed on the display unit 43.

Alternatively, the monitoring person may designate a change of the monitoring range 50 so that the monitoring range 50 does not include the non-illuminated area, while checking the image displayed on the display unit 43.

Information about the specular reflection area or substance is stored in the memory of the substance detection device 1 or 2. For example, in a case where the illuminating unit 10 (the illumination control unit 15) or the illuminating unit 20 (the illumination control unit 25) includes the memory, the information about the range corresponding to the specular reflection area or substance (the prescribed area) or the changed monitoring range 50 is preferably stored in the memory.

The illuminating unit 10 or 20 performs control not to illuminate the non-illuminated area with light based on the information about the specular reflection area or substance. This enables errors due to the specular reflection area or substance to be removed. Further, the information about the specular reflection area or substance is stored in the memory of the image processing unit 42, and the non-illuminated area may thereby be processed as the non-detection area. This enables errors due to the specular reflection area or substance to be further removed.

APPLICATION EXAMPLE 5

In a case where the monitoring range 50 is a room, the window may not be illuminated to avoid leakage of illumination or the like.

The monitoring range 50 whose image is captured by the image-capturing unit 41 may be checked by the monitoring person by the image displayed on the display unit 43 (see FIG. 9). Thus, the monitoring person may designate the range corresponding to the window as "the area that is not illuminated (non-illuminated area)" while checking the image displayed on the display unit 43. Alternatively, the monitoring person may designate a change of the monitoring range 50 so that the monitoring range 50 does not include the non-illuminated area, while checking the image displayed on the display unit 43.

Information about the window is stored in the memory of the substance detection device 1 or 2. For example, in a case where the illuminating unit 10 (the illumination control unit 15) or the illuminating unit 20 (the illumination control unit 25) includes the memory, the information about the window is preferably stored in the memory.

The illuminating unit 10 or 20 performs control not to illuminate the window with light based on the information about the window. This enables leakage of light from the illuminating unit 10 or 20 from the window to be avoided. Further, the information about the window is stored also in the memory of the image processing unit 42, and the non-illuminated area may thereby be processed as the non-detection area. This enables errors due to the window to be further removed.

APPLICATION EXAMPLE 6

In a case where it is desired to detect plural substances with different light absorption characteristics in the monitoring range 50, at least plural light sources are used, which emit light at wavelengths at which the respective substances exhibit high absorptance.

For example, in a case where the monitoring range 50 is a room, the combination of a light source A for detecting water which is spilt on the floor and a light source B for detecting a fungus that attaches to the wall is possible. Particularly, the monitoring range 50 whose image is captured by the image-capturing unit 41 may be checked by the monitoring person by the image displayed on the display unit 43 (see FIG. 9). Accordingly, in a case where the range where target substances are detected is known in advance, the monitoring person may designate the respective areas for detecting the substances or may designate two monitoring ranges 50, while checking the image displayed in the display unit 43.

Information about the designated areas or the monitoring ranges 50 is stored in the memory of the substance detection device 1 or 2. For example, in a case where the illuminating unit 10 (the illumination control unit 15) or the illuminating unit 20 (the illumination control unit 25) includes the memory, the information about the two designated areas or the two monitoring ranges 50 is preferably stored in the memory.

The illuminating unit 10 (the illumination control unit 15) or the illuminating unit 20 (the illumination control unit 25) may be used in different manners such that only the floor area is illuminated by the light from the light source A and only the wall area is illuminated by the light from the light source B.

APPLICATION EXAMPLE 7

The substance detection device 1 or 2 may be mounted on a traveling object (such as an automobile).

Figure 11:
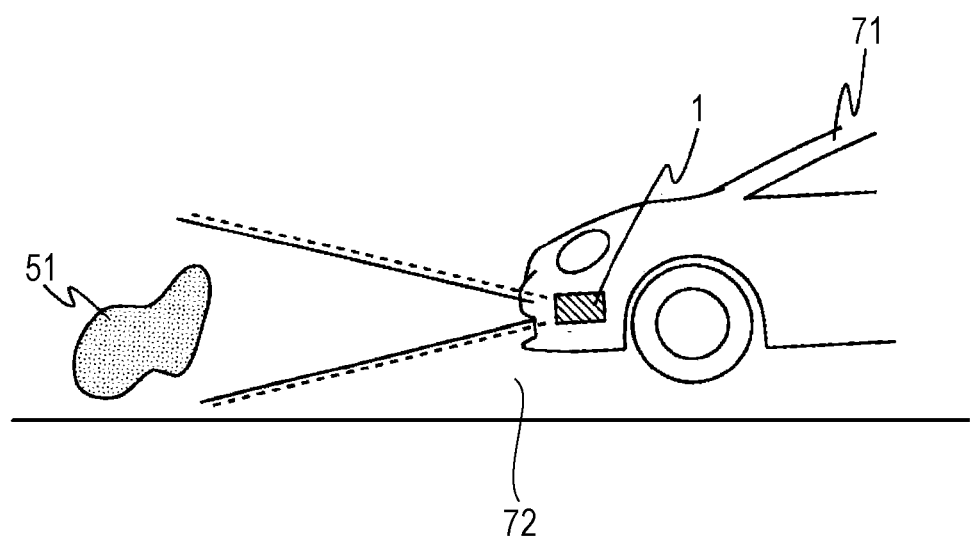
FIG. 11 is a diagram that illustrates one example where the substance detection device is installed in an automobile.

For example, a case is possible where the substance detection device 1 or 2 is mounted on a front portion of an automobile 71 and the substance 51 such as water causing a wet condition or spilt oil on a traveling road surface 72 is detected (see FIG. 11). FIG. 11 is a diagram that illustrates one example where the substance detection device 1 is installed in the automobile 71. For example, assuming a common road in advance, the first reference image and the second reference image or the initial image in a state where water is not present on the road is in advance generated.

Then, because the substance detection device 1 or 2 itself moves, the substance detection process is executed with respect to the road surface as the monitoring range 50. This enables the monitoring person to know a road surface state during travel almost in real time.

APPLICATION EXAMPLE 8

The relationship between the polarization plane and the reflectance of the illumination light changes in response to the angle at which the light emitted from the illuminating unit 10 is incident on the plane of the monitoring range 50 (incident angle). Thus, the polarization plane of the illumination light may be changed based on the incident angle of the illumination light on the monitoring range 50.

The monitoring person understands in which position of the monitoring range 50 (for example, a room) and in which orientation the substance detection device 1 or 2 is mounted (see FIG. 2). That is, the monitoring person in advance knows the incident angle in illuminating the monitoring range 50 with light with respect to each area, such as the light incident angle in illuminating the floor surface with light, the light incident angle in illuminating a right wall surface with light, or the light incident angle in illuminating a left wall surface with light. Thus, for example, in a case where a polarizing device is included in the illuminating unit 10, the monitoring person controls the polarizing device and may thereby apply the polarization plane corresponding to the incident angle that is in advance known to the illumination light. A semiconductor laser that emits linearly polarized light or a light emitting diode or a super-luminescent diode whose emission light is changed to linearly polarized light by an additional polarizing filter is preferably used for the light source.

APPLICATION EXAMPLE 9

In a case where the area in the monitoring range 50, whose image may be captured by the image-capturing unit 41, is changed by functions (such as zoom, pan, and tilt) of the camera as the image-capturing unit 41, the area illuminated with light by the illuminating unit 10 may be changed in response to the changed area.

For example, in a case where an image of a central portion of the monitoring range 50 is captured by the image-capturing unit 41 by causing the camera to zoom in, the scanning unit 14 or the illumination control unit 15 or 25 is controlled such that the illuminating unit 10 illuminates only the central portion with light. This enables power consumption due to unnecessary illumination to be avoided.

In the foregoing, a description has been made about the substance detection devices according to one or plural aspects of the present disclosure based on the embodiments. However, the present disclosure is not limited to the embodiments. Modes in which various kinds of modifications conceived by persons having ordinary skill in the art are applied to the embodiments and modes that are configured by combining elements in different embodiments may be included in the scope of the one or plural aspects of the present disclosure unless the modes depart from the gist of the present disclosure.

A description has been made on the assumption that the illuminating unit 10 or 20 described in the above embodiments are separate from a common illuminating apparatus that illuminates the monitoring range 50 in an ordinary manner. However, in a case where the common illuminating apparatus has a function of arbitrarily changing the wavelength of emission light, the common illuminating apparatus may be used as the illuminating unit 10 or 20. In such a case, the common illuminating apparatus may usually perform common illumination and perform illumination with light at a detection wavelength only during the substance detection process.

For example, in the above embodiments, the elements may be realized by configuring those with hardware such as a dedicated processing circuit or by executing software programs that are suitable for the elements by a general-purpose processing circuit. For example, a program execution unit that has a processing circuit such as a CPU or a processor reads out and executes software programs that are recorded in a recording medium such as a hard disk or a semiconductor memory, and the elements may thereby be realized.

A substance detection device according to the present disclosure is useful for a case of detecting presence of a specific substance such as water or oil and so forth.

What is claimed is:

1. A substance detection device comprising:
an illuminator that illuminates a monitoring range with light at a first wavelength and light at a second wavelength at different timings;
a camera that obtains a first actual image by capturing an image of the monitoring range which is illuminated by the light at the first wavelength and obtains a second actual image by capturing an image of the monitoring range which is illuminated by the light at the second wavelength;
an image processor that acquires a difference in lightness of corresponding pixels between the first actual image and the second actual image that are obtained by the camera, compares an acquired difference in lightness of the corresponding pixels with a reference value, and detects a specific substance that is present in the monitoring range based on a result of the comparison; and
a memory,
wherein, the camera
obtains, before obtaining the first actual image and the second actual image, a first reference image by capturing an image of the monitoring range which is illuminated by the light at the first wavelength while the specific substance is absent, and
obtains, before obtaining the first actual image and the second actual image, a second reference image by capturing an image of the monitoring range which is illuminated by the light at the second wavelength while the specific substance is absent,
each of the first reference image and the second reference image that are obtained by the camera is stored in the memory, and
a difference in lightness of corresponding pixels between the first reference image and the second reference image is set as the reference value.

2. The substance detection device according to claim 1, wherein absorptance of the light at the first wavelength by the specific substance is higher than the absorptance of the light at the second wavelength by the specific substance.

3. The substance detection device according to claim 1, wherein the illuminator includes a scanner that changes areas which are illuminated by the light at the first wavelength and areas which are illuminated by the light at the second wavelength in the monitoring range.

4. The substance detection device according to claim 3, wherein the scanner includes a mirror that reflects each of the light at the first wavelength and the light at the second wavelength and an actuator that changes a direction of the mirror.

5. The substance detection device according to claim 3, wherein
the illuminator adjusts an intensity of the light at the first wavelength in response to the area that is illuminated by the light at the first wavelength to cause lightness of each of the pixels that correspond to the monitoring range in the first reference image to become identical to each other, and
the illuminator adjusts the intensity of the light at the second wavelength in response to the area that is illuminated by the light at the second wavelength to cause lightness of each of the pixels that correspond to the monitoring range in the second reference image to become identical to each other.

6. The substance detection device according to claim 4, wherein a ratio between the intensity of the light at the first wavelength with which the illuminator illuminates the area in the monitoring range in a case of obtaining the first actual image and the intensity of the light at the first wavelength that illuminates the same area as the area in a case of obtaining the first reference image and a ratio between the intensity of the light at the second wavelength with which the illuminator illuminates the area in the monitoring range in a case of obtaining the second actual image and the intensity of the light at the second wavelength that illuminates the same area as the area in a case of obtaining the second reference image are the same.

7. The substance detection device according to claim 1, further comprising:
a light source that produces the light at the first wavelength and the light at the second wavelength.

8. The substance detection device according to claim 7, wherein the light source includes a first light source that produces the light at the first wavelength and a second light source that produces the light at the second wavelength.

9. The substance detection device according to claim 7, wherein the light source is any of a semiconductor laser, a light emitting diode, a super-luminescent diode, and a semiconductor-pumped solid-state laser.

10. The substance detection device according to claim 1, wherein the illuminator illuminates only an area whose image is captured by the camera in the monitoring range with the light.

11. The substance detection device according to claim 1, wherein in a case where a prescribed area in the monitoring range is designated, the image processor detects the specific substance only in the designated area.

12. The substance detection device according to claim 11, wherein the illuminator illuminates only the prescribed area with the light at the first wave length and the light at the second wave length at different timings.

13. The substance detection device according to claim 1, wherein the substance detection device further includes a moving body detector that detects a moving body which is present in the monitoring range, and
the illuminator does not illuminate the moving body which is present in the monitoring range with the light.

* * * * *